(12) United States Patent
Tamura et al.

(10) Patent No.: US 7,653,942 B2
(45) Date of Patent: Jan. 26, 2010

(54) UNAUTHORIZED ACCESS PREVENTION SYSTEM

(75) Inventors: Naohiro Tamura, Kawasaki (JP); Takuya Habu, Kawasaki (JP); Mayuko Morita, Kawasaki (JP); Satoru Torii, Kawasaki (JP); Osamu Koyano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 10/794,097

(22) Filed: Mar. 4, 2004

(65) Prior Publication Data

US 2004/0193892 A1  Sep. 30, 2004

(30) Foreign Application Priority Data

Mar. 31, 2003  (JP) .............................. 2003-095929

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 7/04 | (2006.01) |
| G06F 17/30 | (2006.01) |
| H04N 7/16 | (2006.01) |

(52) U.S. Cl. ........................................ 726/23; 726/27
(58) Field of Classification Search .................. 713/200
See application file for complete search history.

(56) References Cited

U.S. PATENT DOCUMENTS 6,088,451 A * 7/2000 He et al. ...................... 726/8
6,219,706 B1 * 4/2001 Fan et al. ..................... 709/225
6,308,276 B1 * 10/2001 Ashdown et al. ............. 726/11
6,772,347 B1 * 8/2004 Xie et al. ..................... 726/11

(Continued)

FOREIGN PATENT DOCUMENTS

JP        2000-295243        10/2000

(Continued)

OTHER PUBLICATIONS

"Intrusion Detection for Distributed Applications," Stillerman et al, Communications of the ACM, vol. 42, No. 7 pp. 62-69 Jul. 1999.*

(Continued)

*Primary Examiner*—Nasser G Moazzami
*Assistant Examiner*—Oscar A Louie
(74) *Attorney, Agent, or Firm*—Greer, Burns & Crain, Ltd.

(57) ABSTRACT

An unauthorized access prevention system includes a countermeasure method determination unit determining a method of taking countermeasures to protect a destination against unauthorized access based on a rate indicating a probability that predetermined traffic is unauthorized access. The rate is determined by calculating a number of times that the countermeasures were taken and subtracting a number of times that countermeasures were suspended, and dividing the resultant number of times that countermeasures were taken without suspension by the number of times that countermeasures were taken, for the predetermined traffic. The system also includes a storage device storing the number of times that countermeasures were taken and the number of times that countermeasures were taken without suspension. A countermeasure execution control unit controls when to take the countermeasures in the determined method. The countermeasure method determination unit selects an appropriate method of taking countermeasures by comparing the rate to predetermined threshold values.

9 Claims, 30 Drawing Sheets

U.S. PATENT DOCUMENTS

| | | | |
|---|---|---|---|
| 6,895,432 B2* | 5/2005 | Ando et al. | 709/220 |
| 2003/0009699 A1* | 1/2003 | Gupta et al. | 713/201 |
| 2004/0044912 A1* | 3/2004 | Connary et al. | 713/201 |

FOREIGN PATENT DOCUMENTS

| | | |
|---|---|---|
| JP | 2002-16633 | 1/2002 |
| JP | 2002-164938 | 6/2002 |
| JP | 2002-185539 | 6/2002 |

OTHER PUBLICATIONS

"Intrusion Detection for Distributed Applications," Stillerman et al., vol. 42, No. 7 Communications of the ACM, pp. 62-69, Jul. 1999.*

"Efficient fair queueing using deficit round-robin," Shreedhar et al., IEEE/ACM Transction on Networking (TON), vol. 4, Issue 3, pp. 375-385, IEEE Press, Jun. 1996.*

"The SRI IDES statistical anomaly detector," Javitz et al., Research in Security and Privacy, 1991. Proceedings., 1991 IEEE Computer Society Symposium on, pp. 316-326, May 20-22, 1991.*

Kevin J. Houle et al., "Trends in Denial of Service Attack Technology", CERT® Coordination Center, Oct. 2001, pp. 2-20. URL: http://www.cert.org/archive/pdf/DoS_trends.pdf.

Kevin J. Houle and George M. Weaver; "Trends in Denial of Service Attach Technology"; Oct. 2001, CERT Coordination Center, [searched on Feb. 17, 2003], Internet <URL: http://www.cert.org/archive/pdf/DoS_trends.pdf>.

Dave Dittrich; "Distributed Denial of Service (DDoS) Attacks/tools"; [searched on Feb. 17, 2003], Internet <URL: http://staff.washington.edu/dittrich /misc/ddos/>.

Eitaro Saitoh; "Survey and Choice: Network Intrusion Detection Tool;" Nikkei Communications No. 304; Nikkei Communications, Japan; Nikkei Business Publications, Inc; pp. 102-109; Oct. 18, 1999 (partial translation).

* cited by examiner

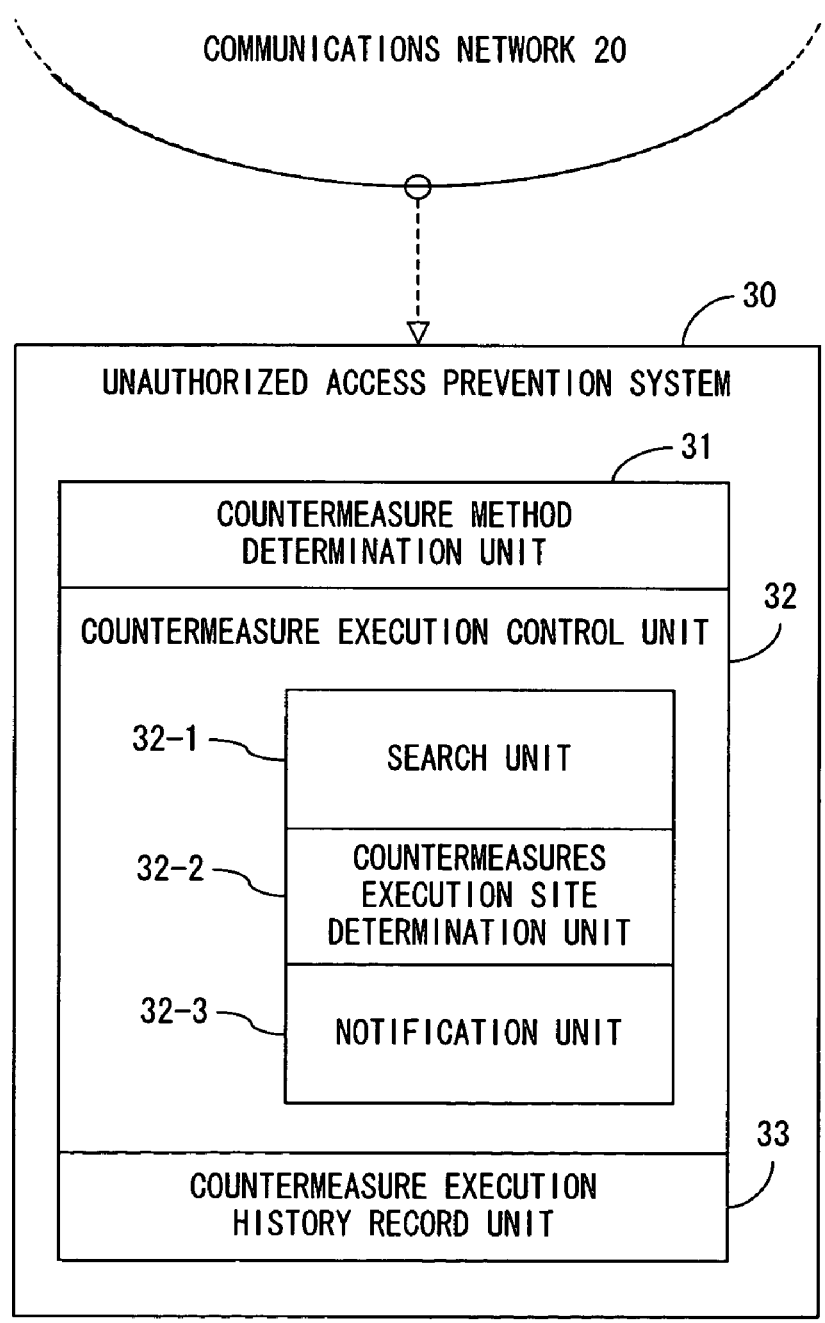
F I G. 3

| DATA MEMBER | EXAMPLE |
| --- | --- |
| COUNTERMEASURE RELEASE TIME THRESHOLD | 10 MINUTES |
| COUNTERMEASURE RELIABILITY THRESHOLD | 90% |
| ROUTER TYPE | Vendor A |
| ROUTER OS | XYZ OS 12.0 |
| ROUTER IP | a.b.c.255 |
| ROUTER ID | admin |
| ROUTER PW | ****** |

F I G. 6

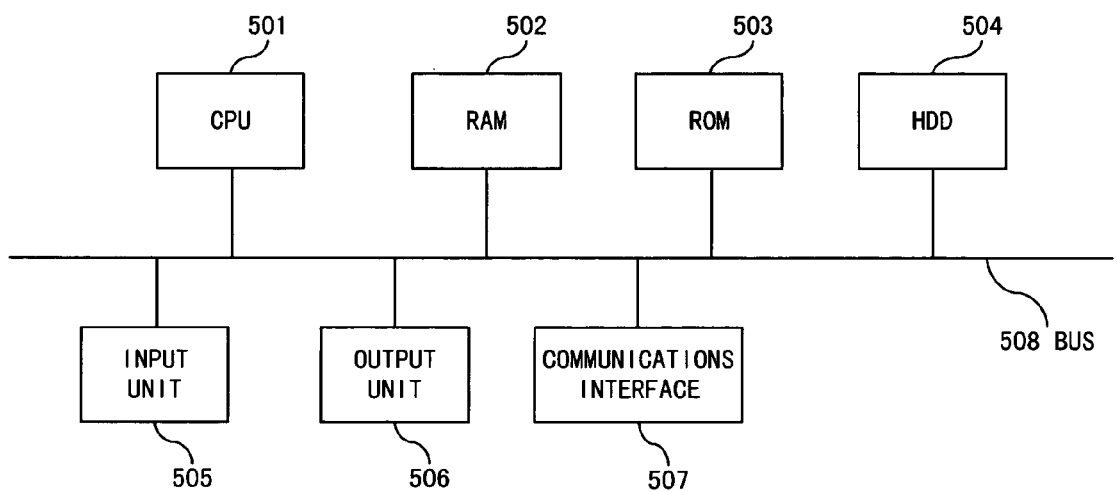
F I G. 7

FIG. 8

UNAUTHORIZED ACCESS COUNTERMEASURE SERVICE OPERATION SCREEN

COUNTERMEASURE-UNDER-EXECUTION LIST

| Src IP | Dist Port | TYPE OF ATTACK | FREQUENCY OF DETECTION | APPROPRIATE COUNTERMEASURE EXECUTION RATE |
|---|---|---|---|---|
| a.b.c.10 | 53 | UDP Flood | 30 | 70% |
| a.b.c.20 | 0 | Smurf | 20 | 80% |
| a.b.c.30 | 80 | Syn Flood | 10 | 90% |

POTENTIAL FALSE-POSITIVE LIST

[COUNTERMEASURE SUSPENSION]

COUNTERMEASURE TARGET LIST

| TIME RANGE | Src IP | Dist IP | Dist Port | NUMBER OF Packets |
|---|---|---|---|---|
| 10:00-10:10 | x.y.z.100 | l.m.n.50 | 53 | 30000 |
| 10:00-10:10 | x.y.z.200 | l.m.n.50 | 53 | 20000 |
| 10:00-10:10 | x.y.z.300 | l.m.n.50 | 53 | 10000 |

POTENTIAL FALSE-NEGATIVE LIST

[COUNTERMEASURE EXECUTION]

| TIME RANGE | Src IP | Dist IP | Dist Port | Count |
|---|---|---|---|---|
| 10:00-10:10 | 202.248.20.254 | 202.248.20.68 | 80 | 1456 |
| 10:00-10:10 | 202.248.20.112 | 202.248.20.68 | 80 | 35724 |
| 10:00-10:10 | 10.34.195.194 | 202.248.20.68 | 80 | 169043 |

F I G. 1 0

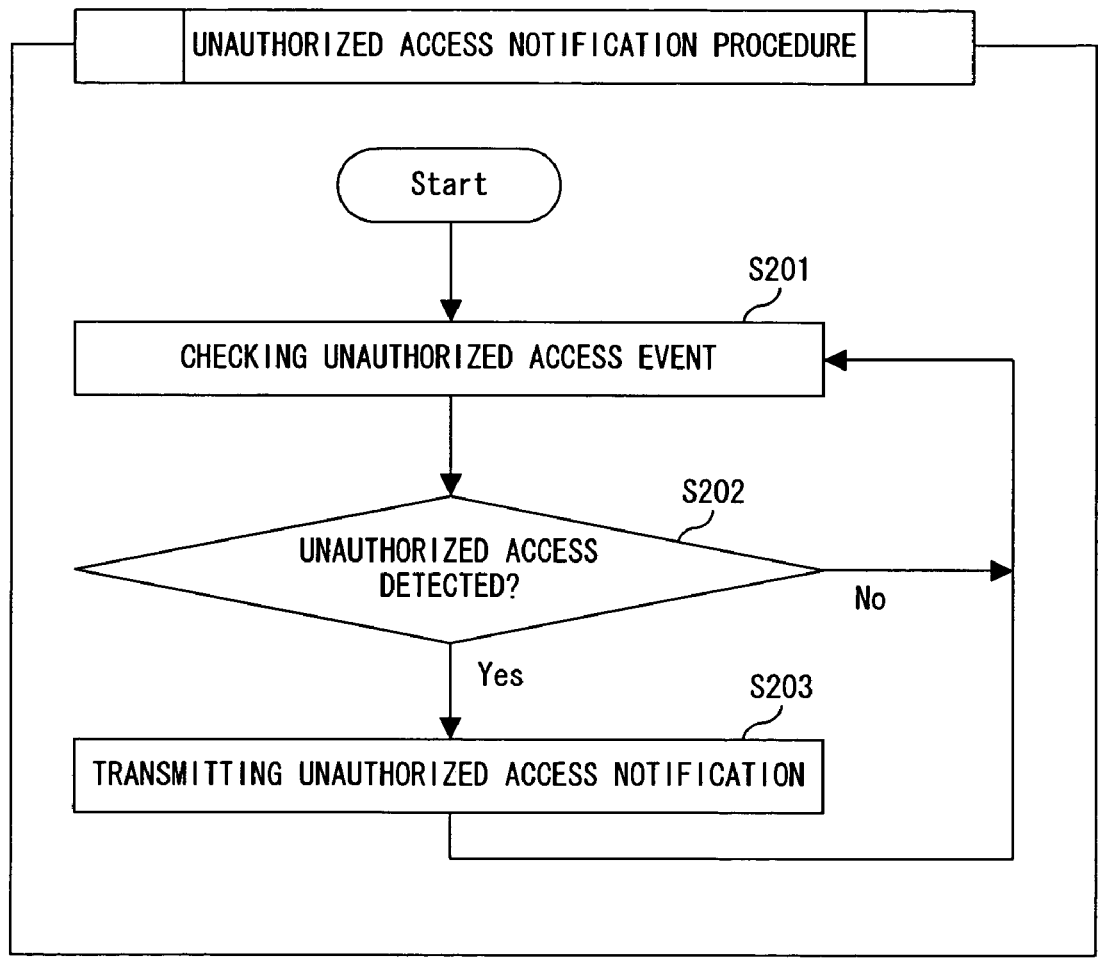
F I G. 1 1

| DATA MEMBER | EXAMPLE 1 | EXAMPLE 2 |
|---|---|---|
| DETECTED ID | 00-00-0E-82-2E-74-001 | 00-00-0E-82-2E-74-002 |
| ACTION | COUNTERMEASURE EXECUTION | COUNTERMEASURE SUSPENSION |
| START OF TIME RANGE (GMT) | 2003/2/1 16:01:16 | 2003/2/17 11:31:11 |
| END OF TIME RANGE (GMT) | 2003/2/1 16:11:16 | 2003/2/17 11:41:11 |
| TYPE OF ATTACK | TCP Syn Flood | Worm |
| ORGANIZATION NAME | Company A | Company B |
| RELATED ISP | ISP ABC | ISP XYZ |
| TARGET PROTOCOL | TCP | UDP |
| Src IP | 10.4.120.Z | 169.0.255.C |
| Dist IP | 192.168.XY | 164.71.A.B |
| Dist Port | 80 | 1434 |
| NUMBER OF UNAUTHORIZED PACKETS | 156789 | 876534 |
| NAME OF ATTACK TOOL | TFN2K | SQL Slammer |
| APPROPRIATE COUNTERMEASURE EXECUTION RATE | 80% | 90% |
| COUNTERMEASURE EXECUTION METHOD | ACL FILTER | FLOW RATE CONTROL |

FIG. 12

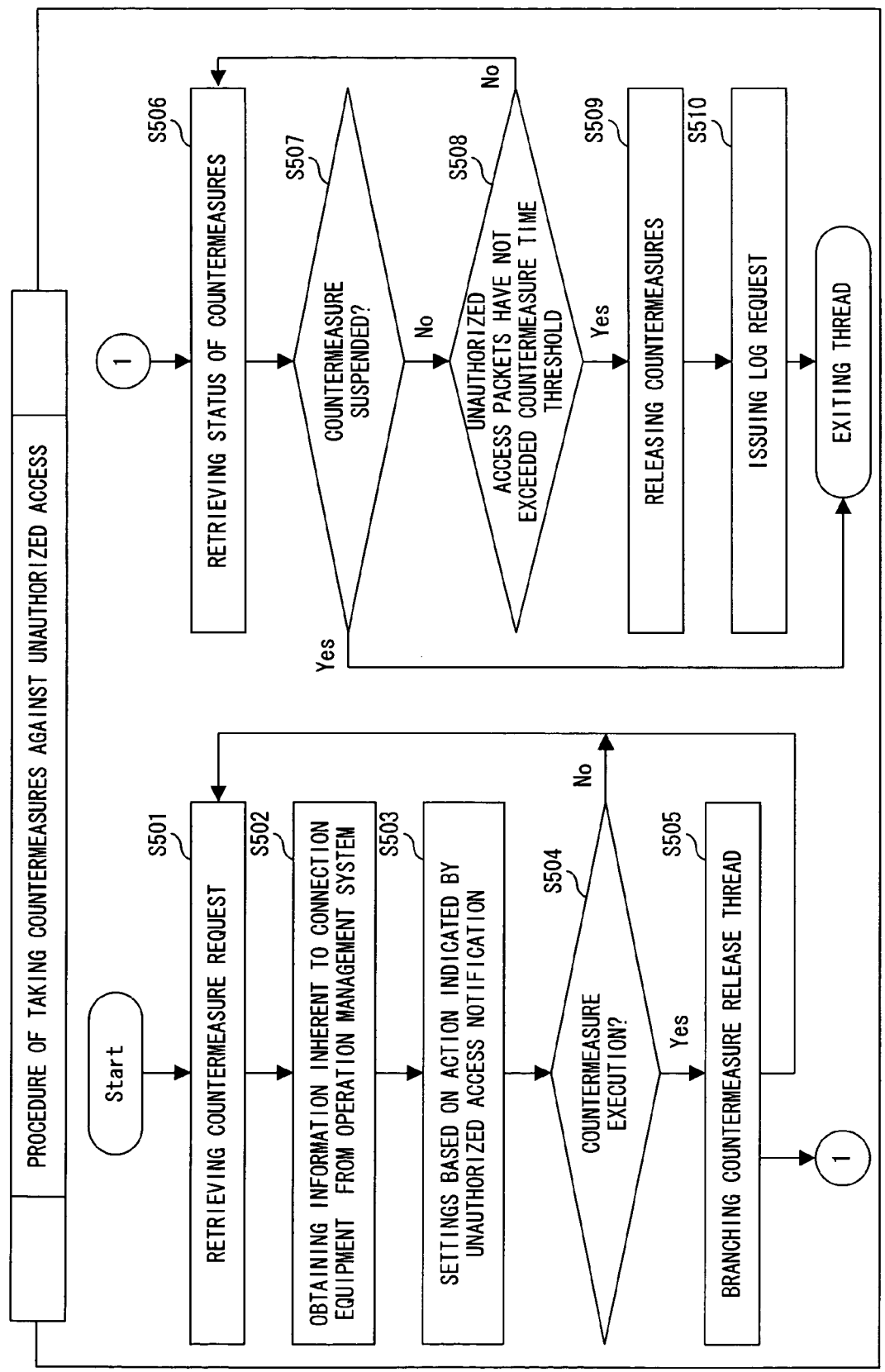
F I G. 16

| CONNECTION ID | TIME RANGE | Src IP | Dist IP | Dist Port | Count |
|---|---|---|---|---|---|
| ABC01234 | 10:00-10:10 | 202.248.20.254 | 202.248.20.68 | 80 | 1456 |
| NBC56780 | 10:00-10:10 | 202.248.20.112 | 202.248.20.68 | 80 | 35724 |
| AS245 | 10:00-10:10 | 10.34.195.194 | 202.248.20.68 | 80 | 169043 |

FIG. 21

| DATA MEMBER | EXAMPLE 1 | EXAMPLE 2 |
|---|---|---|
| DETECTED ID | 00-00-0E-82-2E-74-001 | 00-00-0E-82-2E-74-002 |
| ACTION | COUNTERMEASURE EXECUTION | COUNTERMEASURE SUSPENSION |
| START OF TIME RANGE (GMT) | 2003/2/1 16:01:16 | 2003/2/17 11:31:11 |
| END OF TIME RANGE (GMT) | 2003/2/1 16:11:16 | 2003/2/17 11:41:11 |
| TYPE OF ATTACK | TCP Syn Flood | Worm |
| ORGANIZATION NAME | Company A | Company B |
| RELATED ISP | ISP ABC | ISP XYZ |
| RELATED ISP MANAGER IP | a.b.c.100 | l.m.n.200 |
| TARGET PROTOCOL | TCP | UDP |
| Src IP | 10.4.120.Z | 169.0.255.C |
| Dist IP | 192.168.X.Y | 164.71.A.B |
| Dist Port | 80 | 1434 |
| NUMBER OF UNAUTHORIZED PACKETS | 156789 | 876534 |
| NAME OF ATTACK TOOL | TFN2K | SQL Slammer |
| APPROPRIATE COUNTERMEASURE EXECUTION RATE | 80% | 90% |
| COUNTERMEASURE EXECUTION METHOD | ACL FILTER | FLOW RATE CONTROL |
| COUNTERMEASURE RELEASE POLICY | 10 MINUTES | 20 MINUTES |
| COUNTERMEASURE RELIABILITY POLICY | 90% | 85% |

FIG. 22

UNAUTHORIZED ACCESS PREVENTION SYSTEM

BACKGROUND OF THE INVENTION

1. Field of the Invention

The present invention relates to the technology for preventing unauthorized access in a communications network, and more specifically to the technology of offering a service for preventing unauthorized access, for example, from an Internet service provider (ISP) to a client. Especially, it relates to the technology of taking effective countermeasures against an unauthorized access attack represented by distributed denial of services.

2. Description of the Related Art

The denial of services refers to an attack which suspends or disables a system by intentionally issuing a process request exceeding a permissible limit of system resources, and there is the problem that it is difficult to discriminate between a valid process request and an invalid process request. Among the attacks, those from attackers distributed over a network are called distributed denial of services (DDoS)(hereinafter referred to as "DDoS attacks"). The DDoS attack is described in detail in, for example, the following literature.

Kevin J. Houle and George M. Weaver, "Trends in Denial of Service Attack Technology", October, 2001, CERT Coordination Center, [searched on Feb. 17, 2003], Internet.

The conventional technology for countermeasures against the DDoS attack is basically formed of the unauthorized access detecting technology by an IDS (intrusion detection system) and the defensive technology by packet control. Since the technology is used near an attacker, it is possibly provided with the attacker searching technology. Furthermore, it can be provided with the inter-organization cooperating technology for cooperative defense in a position close to the attacker.

The technological approach to realize countermeasures against a DDoS attack falls roughly into two categories, that is, the existing router replacing system which requires a router loaded with an extension of an IP protocol or a new protocol, and the existing router application system which requires no change of an existing router. The technology disclosed by Japanese Patent Application Laid-open No.2002-164938 which is the Japanese publication of patents is an example of the former system while Japanese Patent Application Laid-open No.2002-16633 which if the Japanese publication of patents is an example of the latter system.

The technological information about the DDoS attack can be located in the following link.

Dave Dittrich "Distributed Denial of Service (DDoS) Attacks/tools" [searched on Feb. 17, 2003], Internet.

However, there are the following potential problems respectively with the unauthorized access detecting technology by an IDS used by the conventional technology for countermeasures against the DDOS attack and the defensive technology by packet control. The problems are described below by referring to FIG. 1.

In an example of configuring a network shown in FIG. 1, a Web system 1001 for providing a Web service is operated in a client site 1000 which is provided with a firewall 1002 for protection against unauthorized intrusion to the Web system 1001. The Web system 1001 is connected to a boundary router 2001 through the firewall 1002.

The boundary router 2001 is managed by an ISP-A 2000 which is an Internet service provider. The ISP-A 2000 is connected to an ISP-B 3000 which is an Internet service provider adjacent to the ISP-A 2000 over a network through a boundary router 2002, and to an ISP-C 4000 which is an Internet service provider adjacent to the ISP-A 2000 over a network through a boundary router 2003, and they are also managed by the ISP-A 2000.

The boundary routers 2001, 2002, and 2003 are interconnected through a router 2004 managed by the ISP-A 2000. The terminal used by a user of the ISP-A 2000 can be connected to the router 2004 to make the ISP-A 2000 available.

The ISP-B 3000 manages a boundary router 3001. The terminal used by a user of the ISP-B 3000 can be connected to the router 3001 to make the ISP-B 3000 available.

The ISP-C 4000 manages a boundary router 4001. The terminal used by a user of the ISP-C 4000 can be connected to the router 4001 to make the ISP-C 4000 available.

The boundary routers 2001, 2002, 2003, 3001, and 4001, and the router 2004 are loaded with an IDS.

By referring to the network with the above-mentioned configuration, the problems with the conventional technology for countermeasures against the DDOS attack is explained.

First, there is the problem of misdetection.

The misdetection of an IDS roughly falls into two cases, that is, a false-positive case in which a non-attack has been misdetected as an attack and a false-negative case in which an attack cannot be successfully detected.

When an authorized user uses an authorized user terminal 4100 to use a Web service by the Web system 1001 with the configuration of the network shown in FIG. 1, the authorized user terminal 4100 is first connected to the boundary router 4001, and authorized access from the authorized user terminal 4100 to the Web system 1001 is gained through the boundary routers 4001, the boundary router 2003, the router 2004, and the boundary router 2001. At this time, for example, the IDS provided in the boundary router 2003 can misdetect the authorized access as unauthorized access, and the boundary router 2003 can cut off the authorized access, thereby causing the false-positive case.

When an attacker intends to make a DDoS attack on, for example, the Web system 1001 using an attacker terminal 2100, the attacker terminal 2100 is connected to the router 2004 first, and unauthorized access from the attacker terminal 2100 to the Web system 1001 is to be gained through the router 2004 and the boundary router 2001. At this time, for example, the IDS provided in the router 2004 can misdetect the unauthorized access as authorized access, and the router 2004 can pass the unauthorized access, thereby causing the false-negative case.

The method of detecting unauthorized access by an IDS roughly falls into two systems, that is, a signature system by packet pattern matching and an anomaly system by detection of an abnormal traffic status. They can potentially include the problem of the misdetection. The misdetection can be reduced to some extent, but cannot be completely removed essentially.

On the other hand, there is the problem of the influence on an authorized user with the defensive technology. That is, since it is difficult to discriminate between a packet of denial of services (attack packet) and a packet of an authorized user (authorized packet), an authorized packet as well as an attack packet can be blocked.

In FIG. 1, for example, when the IDS provided for the boundary router 3001 detects that an attacker who is making a DDoS attack on the Web system 1001 operates an attacker terminal 3100, and tries to connect it to the boundary router 3001 to gain unauthorized access from the attacker terminal 3100 to the Web system 1001, the boundary router 3001 cuts off the unauthorized access. However, by the cutoff of the access, authorized access for a Web service by the Web system 1001 by an authorized user using an authorized user terminal 3200 can also be rejected, which is also the problem with the conventional technology.

The problem occurs because an attack packet which is unauthorized access and an authorized packet which is authorized access are the same in terms of packets, and it is impossible to discriminate between them by comparing them in terms of packets only.

In sum, there are the following problems for the conventional technology for countermeasures against a DDoS attack.

Although a state in which countermeasures are taken against a non-attack, or a state in which no countermeasures are taken against an attack occurs, correct countermeasures are to be taken against unauthorized access attack.

When countermeasures are taken against a DDOS attack, the influence on an authorized user is to be the smallest possible.

SUMMARY OF THE INVENTION

The present invention aims at providing the technology of rejecting unauthorized access capable of reducing the damage suffered in an organization being attacked or the influence on an authorized user by a malfunction in detecting unauthorized access.

The unauthorized access prevention system which is one of the aspects of the present invention includes: a countermeasure execution status screen generation unit for generating a screen on which a case where countermeasures are being taken to protect a destination against unauthorized access in the traffic entering a predetermined position on a communications network can be identified; a countermeasure execution instruction obtaining unit for obtaining an instruction to take the countermeasures to be taken for each type of traffic or an instruction to suspend the countermeasures being taken; and a countermeasure execution control unit for controlling to take the countermeasures or to suspend the countermeasures at the instruction.

With the above-mentioned configuration, a case where countermeasures against unauthorized access are being taken can be immediately discriminated from a case where countermeasures against unauthorized access are not being taken in the above-mentioned traffic by referring to the screen generated by the countermeasure execution status screen generation unit. Therefore, a system administrator can detect on the screen an error of taking or not taking countermeasures against unauthorized access due to a malfunction in detecting unauthorized access by the IDS. Furthermore, since the countermeasure execution control unit controls to take or suspend countermeasures against unauthorized access at an instruction obtained by the countermeasure execution instruction obtaining unit, the countermeasures against unauthorized access can be appropriately taken by the system administrator issuing an instruction to correct an error of taking or not taking the countermeasures against unauthorized access upon detection of the error. As a result, although a malfunction occurs in detecting unauthorized access, the damage suffered in an organization being attacked or the influence on an authorized user can be reduced.

The unauthorized access prevention system according to another aspect of the present invention includes: a countermeasure method determination unit for determining a method of taking countermeasures to protect a destination against unauthorized access in predetermined traffic entering a communications network based on a rate at which the countermeasures were taken without suspension in the predetermined traffic; and a countermeasure execution control unit for controlling to take the countermeasures in the determined method.

When the countermeasures against predetermined traffic were suspended, the traffic was authorized access, but the countermeasures were incorrectly taken. That is, it is assumed that a false-positive malfunction occurred. Therefore, the rate at which the countermeasures were taken against predetermined traffic without suspension refers to an index indicating the level of the correctness of countermeasures against unauthorized access of the traffic. That is, it refers to an index indicating the ratio of the authorized access to the unauthorized access in the predetermined traffic. Therefore, by selecting a method of taking countermeasures based on the rate, countermeasures not to completely cut off the traffic can be suppressed on the traffic containing a lot of authorized access as well as unauthorized access. As a result, the influence of countermeasures against unauthorized access on authorized access can be reduced. That is, since appropriate countermeasures against unauthorized access can be taken depending on the level of the rate of authorized access contained in the traffic, the damage suffered in an organization being attacked or the influence on an authorized user can be reduced although a malfunction occurs in detecting unauthorized access.

BRIEF DESCRIPTION OF THE DRAWINGS

The present invention will be more apparent from the following detailed description when the accompanying drawings are referenced.

FIG. 3 shows the configuration according to the second principle of the unauthorized access prevention system embodying the present invention;

FIG. 6 shows the data structure of setting information;

FIG. 7 shows an example of the configuration of hardware of a computer used as an unauthorized access site;

FIG. 8 shows an example of a user interface screen;

FIG. 10 shows the data structure of the traffic DB according to the first embodiment of the present invention;

FIG. 11 shows the contents of the procedure of an unauthorized access notification;

FIG. 12 shows the data format of an unauthorized access notification according to the first embodiment of the present invention;

FIG. 16 shows the contents of the procedure of taking countermeasures against unauthorized access according to the first embodiment of the present invention;

FIG. 21 shows the data structure of the traffic DB according to the second embodiment of the present invention;

FIG. 22 shows the data format of an unauthorized access notification according to the second embodiment of the present invention;

DESCRIPTION OF THE PREFERRED EMBODIMENTS

The embodiments of the present invention are described below.

First the configuration according to the principle of the unauthorized access prevention system embodying the present invention is described below by referring to FIGS. 2 and 3.

Figure 1:
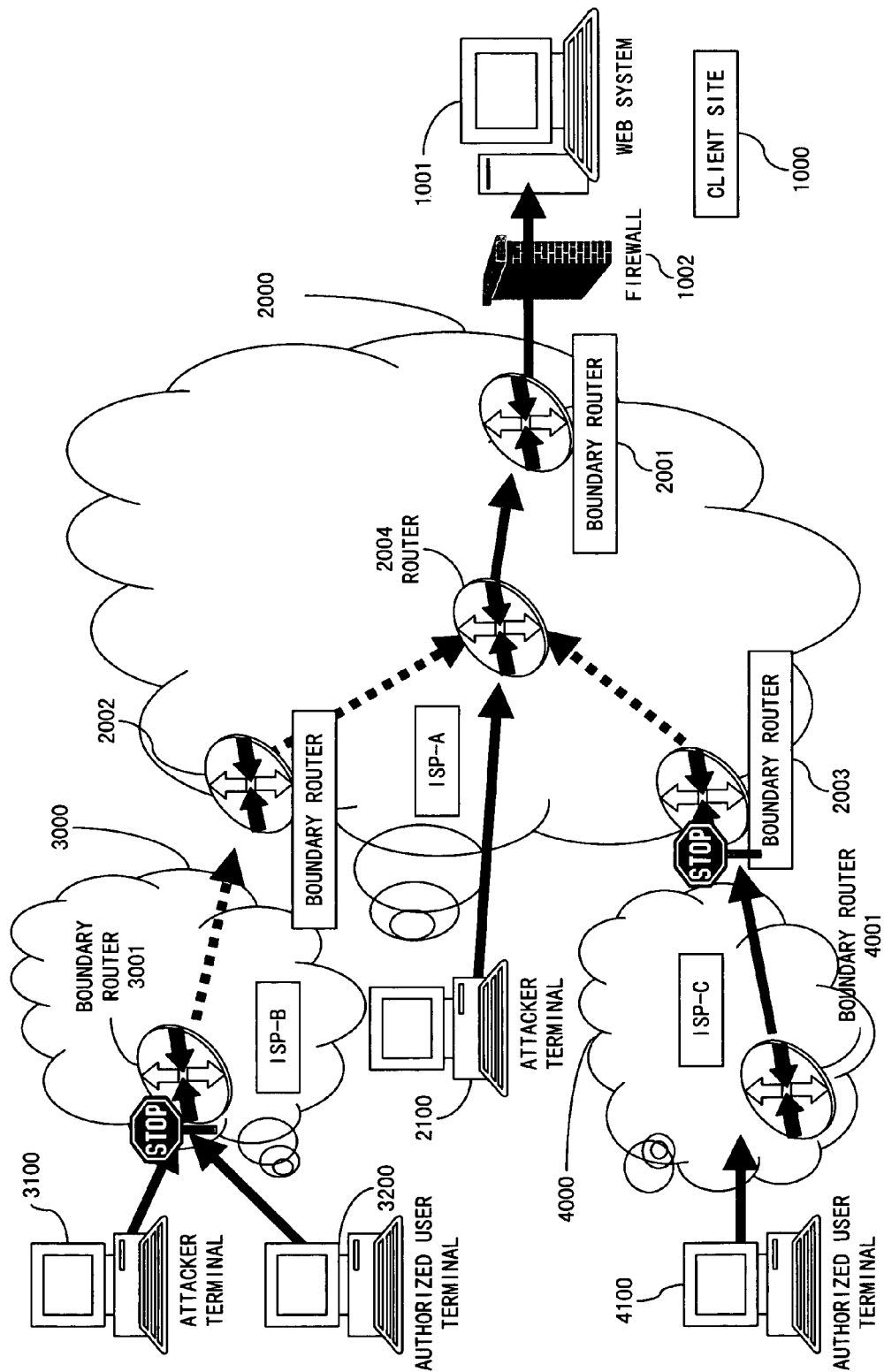
FIG. 1 is an explanatory view showing the problem with the conventional unauthorized access prevention system.
Figure 2:
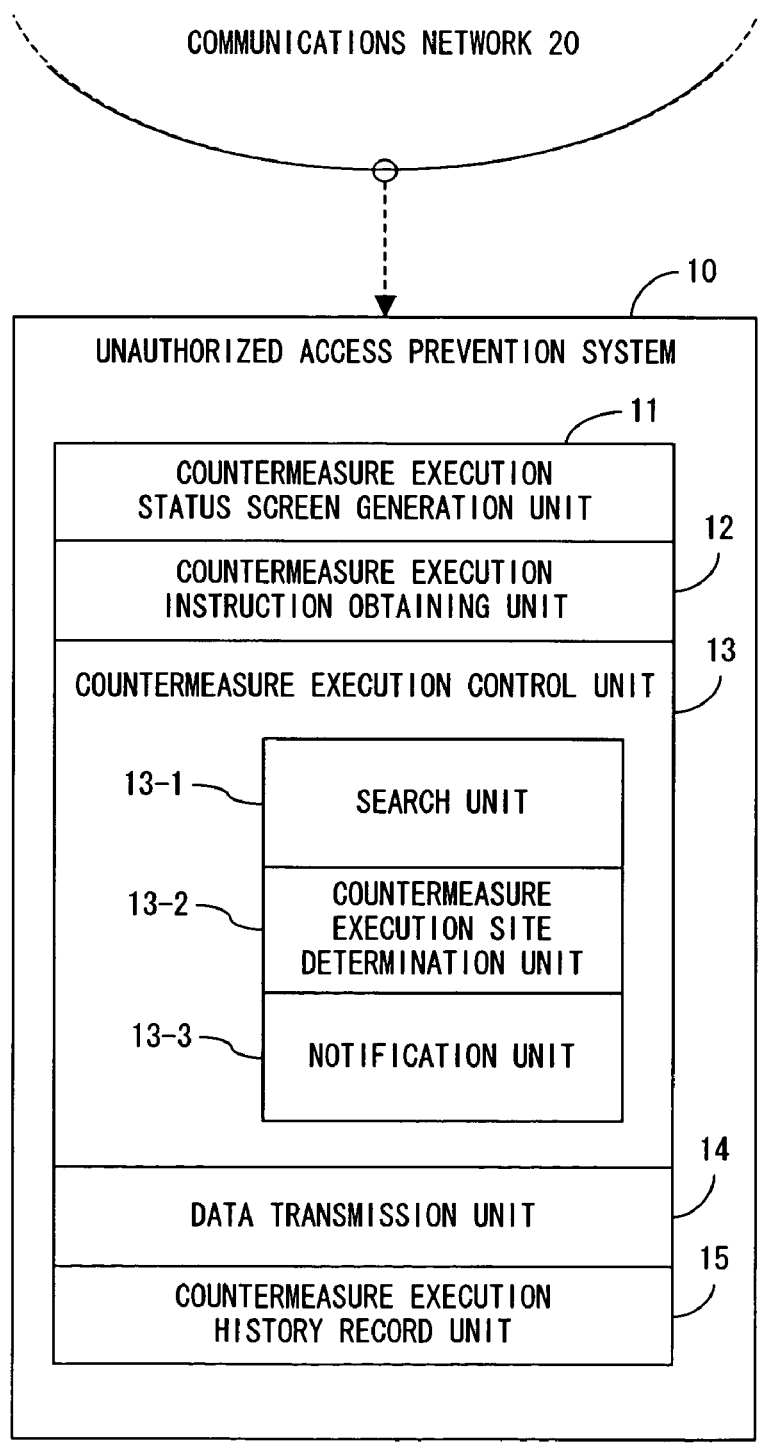
FIG. 2 shows the configuration according to the first principle of the unauthorized access prevention system embodying the present invention.

FIG. 2 shows the configuration according to the first principle of the unauthorized access prevention system embodying the present invention.

In FIG. 2, an unauthorized access prevention system 10 comprises as necessary a countermeasure execution status screen generation unit 11, a countermeasure execution instruction obtaining unit 12, a countermeasure execution control unit 13, a data transmission unit 14, and a countermeasure execution history record unit 15. The countermeasure execution control unit 13 comprises as necessary a search unit 13-1, a countermeasures execution site determination unit 13-2, and a notification unit 13-3.

The unauthorized access prevention system 10 shown in FIG. 2 comprises: a countermeasure execution status screen generation unit 11 for generating a screen on which a case where countermeasures are being taken to protect a destination against unauthorized access in the traffic entering a predetermined position on a communications network 20 can be identified; a countermeasure execution instruction obtaining unit 12 for obtaining an instruction to take the countermeasures to be taken for each type of traffic or an instruction to suspend the countermeasures being taken; and a countermeasure execution control unit 13 for controlling to take the countermeasures or to suspend the countermeasures at the instruction.

With the above-mentioned configuration, the traffic for which countermeasures against unauthorized access are being taken can be immediately discriminated from the traffic for which countermeasures against unauthorized access are not being taken by referring to the screen generated by the countermeasure execution status screen generation unit 11. Therefore, the system administrator can detect on the screen an error of taking or not taking countermeasures against unauthorized access which has occurred due to a malfunction in detecting unauthorized access by the IDS. Additionally, since the countermeasure execution control unit 13 controls the execution or the suspension of the countermeasures against unauthorized access at an instruction obtained by the countermeasure execution instruction obtaining unit 12, the countermeasures against unauthorized access can be appropriately applied by the system administrator following the instruction to correct the error when the system administrator detects the error of taking or not taking countermeasures against unauthorized access. As a result, the damage suffered in an organization being attacked or the influence on an authorized user can be reduced although a malfunction occurs in detecting unauthorized access.

The unauthorized access prevention system 10 according to the above-mentioned present invention can further comprise the data transmission unit 14 for transmitting data for which the screen is displayed to the destination which the traffic passing the above-mentioned position enters. The countermeasure execution instruction obtaining unit 12 can obtain the instruction from the destination.

Thus, the system administrator, etc. at the destination can detect on the screen an error of taking or not taking countermeasures against unauthorized access occurring due to a malfunction in detecting unauthorized access, and issue an instruction to correct the error.

In the unauthorized access prevention system 10 according to the present invention, the countermeasure execution status screen generation unit 11 can generate a screen on which the traffic of each type to be processed with the countermeasures is arranged in the ascending order from the lowest rate at which the countermeasures for each type of traffic have been taken without suspension.

When countermeasures for a type of traffic are suspended, the countermeasures have been taken for the type of traffic although the type of traffic is authorized access. That is, a false-positive malfunction has occurred. Therefore, the traffic of each type is arranged on the above-mentioned generated screen in the descending order from the highest possible false-positive malfunction, that is, from the highest possible erroneous execution of countermeasures against unauthorized access. Therefore, by referring to the screen, the system administrator can determine the presence/absence of the mis-execution of countermeasures against unauthorized access in the descending order from the highest possible mis-execution, thereby quickly applying the countermeasures against unauthorized access in an appropriate method.

At this time, the system can further comprise the countermeasure execution history record unit 15 for recording the history of the control performed by the countermeasure execution control unit 13, and the countermeasure execution status screen generation unit 11 can generate the above-mentioned screen based on the history.

With the above-mentioned configuration, the countermeasure execution status screen generation unit 11 can obtain the rate of the above-mentioned countermeasures taken without suspension for each type of traffic.

Furthermore, in the unauthorized access prevention system 10 according to the above-mentioned present invention, the countermeasure execution status screen generation unit 11 can generate the screen on which the traffic of each type for which the countermeasures are not taken is arranged in the descending order from the most frequent passage through the above-mentioned position.

With the above-mentioned configuration, since the screen is generated with the traffic of each type arranged in the order from the lowest level of the status in which appropriate countermeasures against unauthorized access are being taken, that is, in the descending order from the largest influence of the false-positive malfunction, the presence/absence of the occurrence of the malfunction can be determined, thereby more quickly taking effective countermeasures against unauthorized access.

Furthermore, in the unauthorized access prevention system 10 according to the present invention, the countermeasure execution control unit 13 can comprise: the search unit 13-1 for searching an entry path of the above-mentioned unauthorized access to the communications network 20; the countermeasures execution site determination unit 13-2 for determining the site on which the above-mentioned countermeasures are to be taken based on the search result; and the notification unit 13-3 for issuing to a source of the unauthorized access to the communications network 20 a notification of the determination of the execution of the countermeasures and an instruction obtained by the execution of the countermeasure execution instruction obtaining unit 12 when the determination is made to take the countermeasures at the source.

With the above-mentioned configuration, since the notification that the above-mentioned countermeasures against unauthorized access are taken at the source of the unauthorized access to the communications network 20 can be announced to the source, countermeasures against unauthorized access can be taken in a place closer to the source, that is, the source of unauthorized access. As a result, effective countermeasures can be taken against distributed denial of services.

At this time, the notification unit 13-3 can issue the notification after mutually performing an authentication check with the source of unauthorized access.

Thus, a third party who pretends to be a source is suppressed in receiving the notification.

The connection protocol with the source for use in mutual authentication can be, for example, an HTTPS (hypertext transfer protocol security), the authentication system for use in the mutual authentication can be, for example, a public key infrastructure (PKI), and the electronic certificate can be, for example, in the format in accordance with the recommendation X.509 of the International Telecommunication Union (ITU).

At this time, the notification unit 13-3 can issue the above-mentioned notification to the source after exchanging information about the security policy in each network operation with the source of unauthorized access.

Thus, although there is a difference in security policy from the source, the difference can be adjusted and then countermeasures can be taken against unauthorized access for the source.

Described below is the configuration shown in FIG. 3. FIG. 3 shows the configuration according to the second principle of the unauthorized access prevention system embodying the present invention.

In FIG. 3, an unauthorized access prevention system 30 comprises as necessary a countermeasure method determination unit 31, a countermeasure execution control unit 32, and a countermeasure execution history record unit 33. The countermeasure execution control unit 32 comprises as necessary a search unit 32-1, a countermeasures execution site determination unit 32-2, and a notification unit 32-3.

The unauthorized access prevention system 30 shown in FIG. 3 is configured to include the countermeasure method determination unit 31 for determining a method of taking countermeasures to protect a destination against unauthorized access in predetermined traffic entering a communications network based on a rate at which the countermeasures were taken without suspension in the predetermined traffic; and a countermeasure execution control unit 32 for controlling to take the countermeasures in the determined method.

When the countermeasures against predetermined traffic were suspended, the traffic was authorized access, but the countermeasures were incorrectly taken. That is, it is assumed that a false-positive malfunction occurred. Therefore, the rate at which the countermeasures were taken against predetermined traffic without suspension refers to an index indicating the level of the correctness of countermeasures against unauthorized access of the traffic. That is, it refers to an index indicating the ratio of the authorized access to the unauthorized access in the predetermined traffic. Therefore, by selecting a method of taking countermeasures based on the rate, countermeasures not to completely cut off the traffic can be suppressed on the traffic containing a lot of authorized access as well as unauthorized access. As a result, the influence of countermeasures against unauthorized access on authorized access can be reduced. That is, since appropriate countermeasures against unauthorized access can be taken depending on the level of the rate of authorized access contained in the traffic, the damage suffered in an organization being attacked or the influence on an authorized user can be reduced although a malfunction occurs in detecting unauthorized access.

When an ACL (access control list) filter or flow rate control can be selected as a result of the above-mentioned determination, the countermeasure method determination unit 31 can select the ACL filter when the above-mentioned rate is larger than a predetermined threshold, and can select flow rate control when the rate is smaller than the predetermined threshold. Otherwise, when an ACL filter or queue control can be selected as a result of the above-mentioned determination, the countermeasure method determination unit 31 can select the ACL filter when the above-mentioned rate is larger than a predetermined threshold, and can select queue control when the rate is smaller than the predetermined threshold. Or when flow rate control or queue control can be selected as a result of the above-mentioned determination, the countermeasure method determination unit 31 can select the flow rate control when the above-mentioned rate is larger than a predetermined threshold, and can select queue control when the rate is smaller than the predetermined threshold.

The unauthorized access prevention system 30 according to the above-mentioned present invention can further comprise the countermeasure execution history record unit 33 for recording the history of control performed by the countermeasure execution control unit 32 so that the countermeasure method determination unit 31 can determine the above-mentioned method for countermeasures according to the history.

With the above-mentioned configuration, the countermeasure method determination unit 31 can obtain the rate at which the countermeasures were taken without suspension for the traffic.

Furthermore, in the unauthorized access prevention system 30 according to the present invention, the countermeasure execution control unit 32 can comprise: the search unit 32-1 for searching an entry path of the above-mentioned unauthorized access to the communications network 20; the countermeasures execution site determination unit 32-2 for determining the site on which the above-mentioned countermeasures are to be taken based on the search result; and the notification unit 32-3 for issuing to a source of the unauthorized access to the communications network 20 a notification of the determination of the execution of the countermeasures and a method determined by the countermeasure method determination unit 31 when the determination is made to take the countermeasures at the source.

With the above-mentioned configuration, since the notification that the above-mentioned countermeasures against unauthorized access are taken at the source of the unauthorized access to the communications network 20 can be announced to the source, countermeasures against unauthorized access can be taken in a place closer to the source, that is, the source of unauthorized access. As a result, effective countermeasures can be taken against distributed denial of services.

At this time, the notification unit 32-3 can issue the notification after mutually performing an authentication check with the source of unauthorized access.

Thus, a third party who pretends to be a source is suppressed in receiving the notification.

The connection protocol with the source for use in mutual authentication can be, for example, an HTTPS (hypertext transfer protocol security), the authentication system for use in the mutual authentication can be, for example, a public key infrastructure (PKI), and the electronic certificate can be, for example, in the format in accordance with the recommendation X.509 of the International Telecommunication Union (ITU).

At this time, the notification unit 33-3 can issue the above-mentioned notification to the source after exchanging information about the security policy in each network operation with the source of unauthorized access.

Thus, although there is a difference in security policy from the source, the difference can be adjusted and then countermeasures can be taken against unauthorized access for the source.

The information about the security policy can be the information about the threshold of the above-mentioned rate based on which the method for the above-mentioned countermeasures is determined by, for example, the countermeasure method determination unit 31. Furthermore, for example, when the threshold indicated by the information about the security policy is different between the communications network 20 and the source, the countermeasure method determination unit 31 can define a larger value between them as a threshold of the rate based on which the method for the countermeasures is determined.

Thus, although there is a difference in security policy about the threshold between them, the countermeasures permissible between can be requested to the source.

The operations and effects similar to those of the unauthorized access prevention system according to the present invention can be obtained by directing a computer to execute a program of the same processes as the functions performed with each configuration of the above-mentioned unauthorized access prevention system according to the present invention.

Additionally, the operations and effects similar to those of the unauthorized access prevention system according to the present invention can be obtained in the method including the procedure performed with each configuration of the above-mentioned unauthorized access prevention systems according to the present invention.

Embodiment 1

Figure 4:
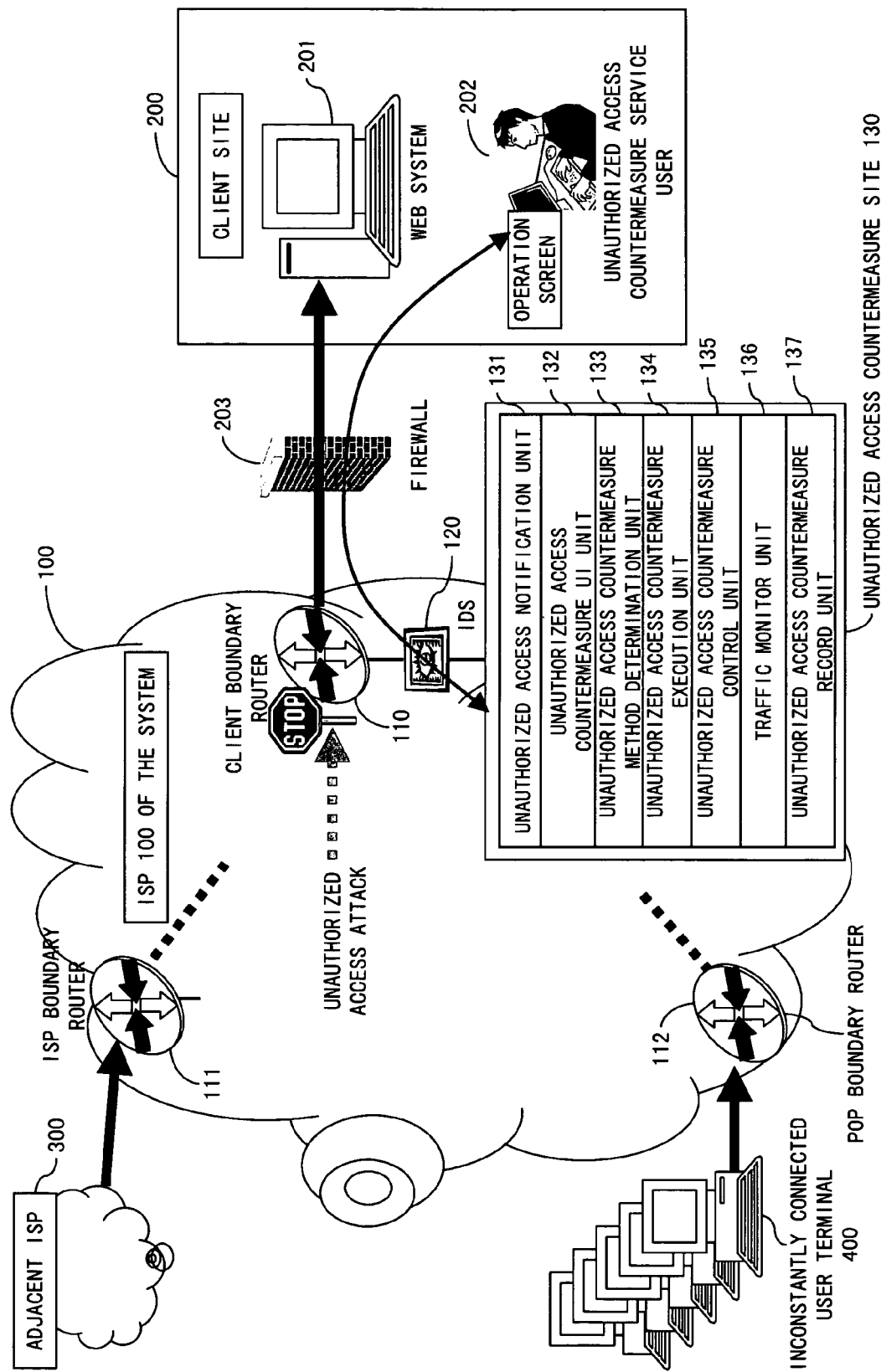
FIG. 4 shows the first example of the configuration of the unauthorized access prevention system embodying the present invention.

FIG. 4 shows the first example of the configuration of the unauthorized access prevention system embodying the present invention.

In FIG. 4, an ISP (Internet service provider) 100 of the system is a communications network of the system.

A Web system 201 of a client site 200 publishes the Web service from the ISP 100 of the system, and is connected to a client boundary router 110 managed by the client boundary router 110 of the system through a firewall 203.

An adjacent ISP 300 is a communications network logically adjacent to the ISP 100 of the system, and the adjacent ISP 300 is connected to the ISP 100 of the system through an ISP boundary router 111.

An inconstantly connected user terminal 400 is a terminal used by a user who is not constantly connected (inconstantly connected user) in the users of the ISP 100 of the system. The ISP 100 of the system can be used through the terminal by way of a POP boundary router 112 upon connection to a POP (point of presence).

The client boundary router 110 is countermeasure execution equipment for execution of the countermeasures against unauthorized access to the Web system 201.

The client boundary router 110 uses a router having a countermeasure facility against unauthorized access. However, according to the present embodiment, the client boundary router 110 has at least an ACL filter as the countermeasure facility for selecting only a packet matching the contents of the definition set in an ACL (access control list), and cutting off or passing the packet. The countermeasure facility, in addition to the ACL filter, can be a router having an exclusive defense facility against an attack of continuously transmitting a large number of TCP connection requests (SYN) for a short time (TCP syn flood) (the facility is hereinafter referred to as "TCP connection control"), a flow rate control facility of restricting the flow rate within a predetermined amount by discarding a part of incoming packets to the client boundary router 110, a queue control facility of leveling the rate of the number of packets passing per unit time through the client boundary router 110 for each source, etc.

For the flow rate control facility of the currently marketed router, a system of restricting the flow rate within a specified band, and a system of guaranteeing at least a specified band as a flow rate are prepared.

For example, in the former system, when the specified band of 2 Mbps is set for a specified traffic, when the network has room enough for the specified band, and when the flow rate of the specified traffic exceeds 2 Mbps, the excess amount is discarded.

On the other hand, in the latter system, although the flow rate of the specified traffic exceeds 2 Mbps, the excess amount is not discarded if there is room in the network band. For example, when the above-mentioned settings are assumed, the network band of 10 Mbps is available, and the flow rate of the specified traffic is 3 Mbps, the specified traffic is not discarded, and all specified traffic can pass through the router.

However, in this case, if another traffic other than the specified traffic enters the network, and the flow rate of the traffic is 10 Mbps, then the traffic corresponding to the excess amount of 1 Mbps is discarded to restrict the flow rate of the specified traffic within the specified band of 2 Mbps (at this time, the other unspecified traffic is also limited to 8 Mbps).

The router used as the client boundary router 110 according to the present embodiment falls into the former system if it has the flow rate control facility.

An IDS (intrusion detecting system) 120 detects unauthorized access to the Web system 201 in the client site 200 using the countermeasure execution status screen generation unit 11, and analyzes the contents of the detected unauthorized access.

An unauthorized access countermeasure site 130 includes an unauthorized access notification unit 131, an unauthorized access countermeasure UI unit 132, an unauthorized access countermeasure method determination unit 133, an unauthorized access countermeasure execution unit 134, an unauthorized access countermeasure control unit 135, a traffic monitor unit 136, and an unauthorized access countermeasure record unit 137.

The unauthorized access notification unit 131 cooperates with the IDS 120 to issue a notification of an unauthorized access attack to the Web system 201 (unauthorized access notification).

The unauthorized access countermeasure UI unit 132 provides a user interface (UI) which is an operation screen displayed on an unauthorized access countermeasure service user terminal 202 operated by the system administrator of the client site 200. The UI has a menu on which a list of countermeasures against unauthorized access currently being taken after unauthorized access is detected by the IDS 120 is displayed for each type of traffic for which the countermeasures are taken in an ascending order of the appropriate countermeasure execution rate obtained from the past history, and an instruction to suspend the execution of the countermeasures for a client against a false-positive malfunction by the IDS 120 can be issued, and a menu on which a list of traffic for which countermeasures are currently not taken because the IDS 120 has failed in detecting unauthorized access is displayed for each type of traffic in a descending order of the number of incoming packets, and an instruction to correct the non-execution of countermeasures against a false-negative malfunction by the IDS 120 (that is, an instruction to take countermeasures).

The unauthorized access countermeasure method determination unit 133 determines an appropriate unauthorized access prevention method according to the information indicated in the unauthorized access notification and the unique information about countermeasure execution equipment, which is, in FIG. 4, the client boundary router 110.

The unauthorized access countermeasure execution unit 134 controls the client boundary router 110 which is countermeasure execution equipment to take countermeasures against unauthorized access or to release the countermeasures being executed.

The unauthorized access countermeasure control unit 135 manages and controls the session from detecting unauthorized access to executing countermeasures against unauthorized access performed at the unauthorized access countermeasure site 130.

The traffic monitor unit 136 monitors the traffic passed by the client boundary router 110, and collect the information about the traffic.

The unauthorized access countermeasure record unit 137 records the operation of each session performed at the unauthorized access countermeasure site 130 involved in the execution, suspension, release, etc. of the countermeasures against unauthorized access in the client boundary router 110.

Figure 5:
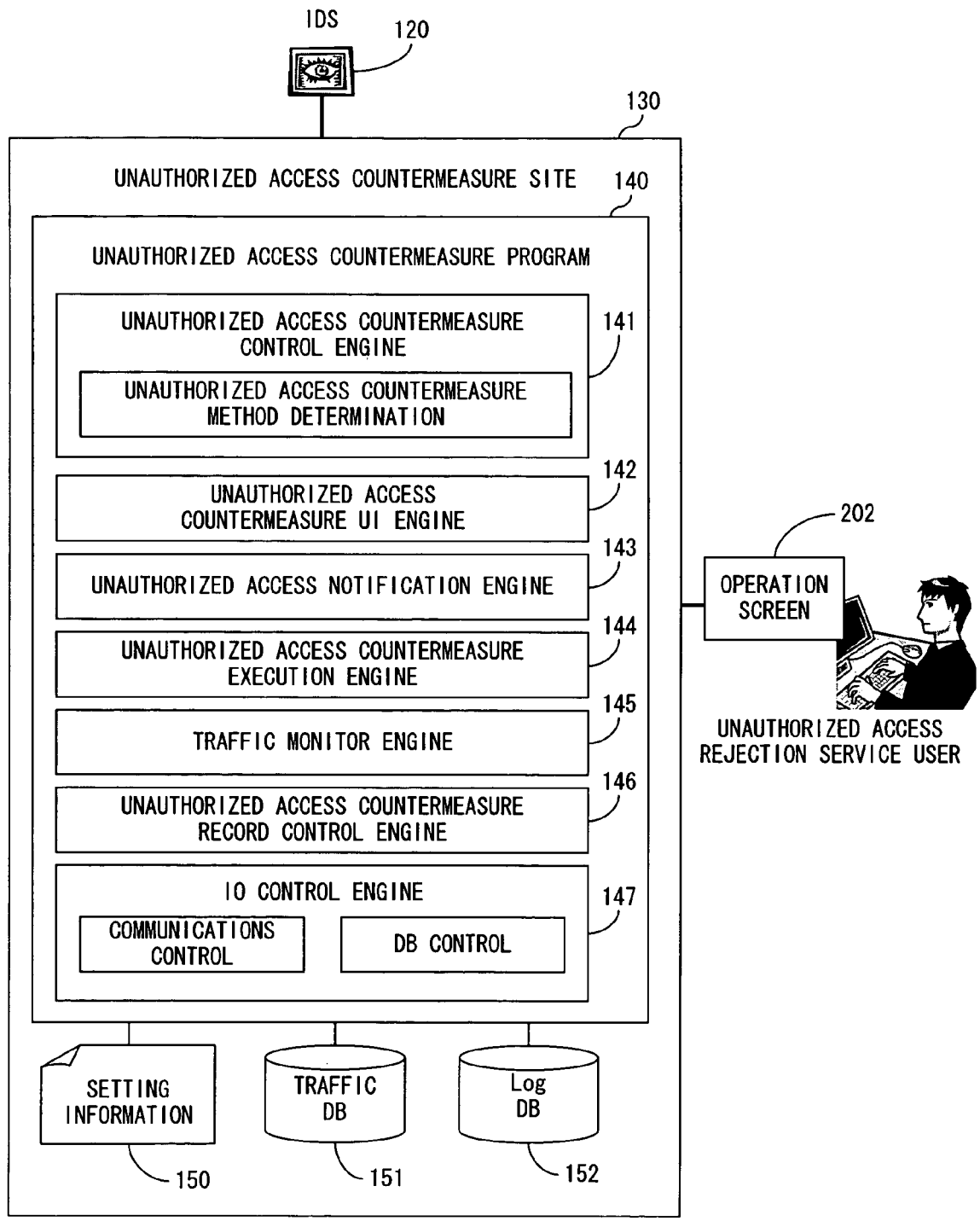
FIG. 5 is a block diagram of the unauthorized access prevention program.

The entity of the unauthorized access countermeasure site 130 is a computer, and the unauthorized access countermeasure site 130 has the configuration shown in FIG. 4 by executing an unauthorized access countermeasure program 140 at the unauthorized access countermeasure site 130 as shown in FIG. 5.

When the unauthorized access countermeasure program 140 is executed at the unauthorized access countermeasure site 130, an unauthorized access countermeasure control engine 141, an unauthorized access countermeasure UI engine 142, an unauthorized access notification engine 143, an unauthorized access countermeasure execution engine 144, a traffic monitor engine 145, an unauthorized access countermeasure record control engine 146, and an IO control engine 147 are configured.

The unauthorized access countermeasure control engine 141 functions as the unauthorized access countermeasure method determination unit 133 and the unauthorized access countermeasure control unit 135.

The unauthorized access countermeasure UI engine 142 functions as the unauthorized access countermeasure UI unit 132.

The unauthorized access notification engine 143 functions as the unauthorized access notification unit 131.

The unauthorized access countermeasure execution engine 144 functions as the unauthorized access countermeasure execution unit 134.

The traffic monitor engine 145 functions as the traffic monitor unit 136, and stores the collected information in a traffic DB (database) 151.

The unauthorized access countermeasure record control engine 146 functions as the unauthorized access countermeasure record unit 137, and records in the Log DB 152 the operation of each session performed at the unauthorized access countermeasure site 130 involved in the execution, suspension, release, etc. of the countermeasures against unauthorized access in the client boundary router 110.

The IO control engine 147 controls the communications of various data with the client boundary router 110, the IDS 120, the unauthorized access countermeasure service user terminal 202, etc., and controls the operation of a traffic DB 151 and a Log DB 152.

Setting information 150 is a data file indicating the information about the security policy of the ISP 100 of the system, and the information unique to the countermeasure execution equipment (the client boundary router 110 in the present embodiment).

FIG. 6 shows an example of the data of the setting information 150. The setting information 150 indicates the data of "countermeasure release time threshold" and "countermeasure reliability threshold" as the information about the security policy, and the data of "router type", "router OS", "router IP", "router ID", and "router password" as the information unique to the countermeasure execution equipment.

The countermeasure release time threshold indicates the time taken from the determination of the IDS 120 that the unauthorized access to the Web system 201 has stopped to the release of the countermeasures. In this example, the time is set to "10 minutes". The time is set in advance at an instruction from the system administrator of the client site 200 which is, for example, being attacked by unauthorized access.

The countermeasure reliability threshold indicates a reference value for determination of the method of countermeasures against unauthorized access used by the countermeasure execution equipment. In this example, the value is set to "90%".

The router type indicates the name of the manufacturer and the name of the model of the countermeasure execution equipment. In this example, the information is "Vendor A".

The router OS indicates the name and the version number of the OS (operating system) being used in the countermeasure execution equipment. In this example, the "twelfth" version of "XYZ OS" is used.

The router IP indicates the IP (Internet protocol) address assigned to the countermeasure execution equipment. In this example, the IP address of "a. b. c. 255" is assigned.

The router ID indicates the ID (identification) information required in logging into the countermeasure execution equipment to designate various settings of operations. The router PW (password) indicates the password information also required in logging into the equipment. In this example, the router ID is "admin", and the router PW is "******"

The setting information 150 includes the above-mentioned information.

The traffic DB 151 is a database in which the information about the traffic passed by the client boundary router 110 is recorded.

The Log DB 152 is a database in which the history of the operations of each session performed in the unauthorized access prevention system involved in the execution, suspension, release, etc. of the countermeasures against unauthorized access in the client boundary router 110 which is the countermeasure execution equipment is recorded.

The unauthorized access countermeasure site 130 can be configured using a computer having a standard hardware configuration as shown in, for example, FIG. 7.

Described below is the configuration shown in FIG. 7.

The computer shown in FIG. 7 is configured by interconnecting a CPU 501, RAM 502, ROM 503, a HDD 504, an input unit 505, an output unit 506, and a communications interface 507 through a bus 508. These components can communicate data under the control of the CPU 501.

The CPU 501 is a central processing unit for controlling the entire operation of the computer.

The RAM (random access memory) 502 is used as work memory when the CPU 501 executes various control programs including the unauthorized access countermeasure program 140, and also used as main memory for use as a temporary storage area of various data as necessary.

The ROM (read only memory) 503 stores in advance a basic control program executed by the CPU 501. When the computer is activated, the CPU 501 executes the basic control program to allow the CPU 501 to control basic operations of the entire computer.

The HDD (hard disk drive) 504 is a hard disk device used as a database storing various data. The HDD 504 stores in advance various control programs such as the unauthorized access countermeasure program 140, etc. executed by the CPU 501.

The input unit 505 receives external input and transmits the contents of the input to the CPU 501, and is configured as necessary by, for example, an input device for receiving an instruction from an operator who operates the computer such as a keyboard, a mouse, etc. or a read device for a portable storage medium such as an FD (flexible disk), CD-ROM (compact disk-ROM), DVD-ROM (digital versatile disc-ROM), an MO (magneto-optics) disk, etc.

The output unit 506 outputs data at an instruction from the CPU 501, and can be, for example, a display device configured by a CRT (cathode ray tube) and an LCD (liquid crystal display) for displaying various data, a printer device, etc. for displaying and displaying various data.

The communications interface 507 manages communications when communicating data with another system.

The computer shown in FIG. 7 is configured by the above-mentioned components.

Described below is the screen shown in FIG. 8. FIG. 8 shows an example of a user interface screen provided by the unauthorized access countermeasure UI unit 132.

The countermeasure-under-execution list displayed on the left of the screen shown in FIG. 8 is obtained by arranging the traffic which is the target of the countermeasures against unauthorized access being executed together with the "number of times of detection" and the "appropriate countermeasure execution rate" using "Src IP", "Dist Port", and a type of attack as keys in the ascending order of the "appropriate countermeasure execution rate" of each type of traffic.

Src IP refers to an IP address of the source indicated in an IP packet (hereinafter referred to simply as a "packet") which is the traffic for which the countermeasures against unauthorized access are taken.

Dist Port refers to a port number of the destination indicated in a packet which is the traffic for which the countermeasures against unauthorized access are taken.

The type of attack indicates the detailed type of DDOS attack of the unauthorized access defected by the IDS 120.

The number of times of detection indicates the number of times the IDS 120 has detected the traffic as a DDoS attack.

The appropriate countermeasure execution rate indicates the rate of executing the countermeasures against unauthorized access taken in the past for the traffic without suspension, and is calculated by the following equation.

(appropriate countermeasure execution rate)={(countermeasure execution frequency)−(countermeasure suspension frequency)}/(countermeasure execution frequency)

According to the present embodiment, when the IDS 120 detects that the traffic is a DDOS attack, it is assumed that the countermeasures against unauthorized access are necessarily taken once regardless of the correctness of the detection result. Since the countermeasures against unauthorized access are suspended after the countermeasures are taken, the countermeasure suspension frequency is equal to or lower than the countermeasure execution frequency. Therefore, the appropriate countermeasure execution rate is in the range of 0~100%.

Described below is an example of data in the first row of the countermeasure-under-execution list shown in FIG. 8. The example of the data indicates that since the IDS 120 determines a packet having "a. b. c. 10" as the IP address of the source, and "53" as the port number of the destination is a "UDP Flood" attack, the client boundary router 110 is executing the countermeasures against unauthorized access for the traffic of the packet. Furthermore, it indicates that the IDS 120 has detected the type of traffic as a DDOS attack "30" times, and the appropriate countermeasure execution rate against unauthorized access for the past execution on the traffic is "70%".

The column of the "appropriate countermeasure execution rate" in the countermeasure-under-execution list shown in FIG. 8 shows that the values of the column are "70%", "80%", and "90%"sequentially from the top, and each record is arranged in the ascending order of the "appropriate countermeasure execution rate".

A button icon of "suspend countermeasures" is provided at the lower portion of the countermeasure-under-execution list.

When the button icon is clicked after selecting the traffic determined to have been mistakenly processed by a false-positive malfunction of the IDS 120 from each type of traffic for which the countermeasures against unauthorized access are taken in the countermeasure-under-execution list by a user of the service for preventing unauthorized access, that is, a system administrator of the client site 200 in the present embodiment, the countermeasures against unauthorized access executed by the client boundary router 110 for the selected traffic can be suspended.

The non-countermeasure-target list displayed on the right of the screen shown in FIG. 8 is obtained by arranging the traffic monitored by the traffic monitor unit 136 and passed by the client boundary router 110 together with the "number of packets" using "time range", "Src IP", "Dist IP", and "Dist Port" as keys in the descending order of the "number of packets" of each type of traffic.

The time range indicates the range of the traffic monitor time.

Src IP is an IP address of the source indicated in the packet which is the traffic passed by the client boundary router 110.

Dist IP is an IP address of the destination indicated in the packet passed by the client boundary router 110.

Dist Port is a port number of the destination indicated in the packet which is the traffic passed by the client boundary router 110.

The number of packets indicates the number of packets of the type passed by the client boundary router 110 during the time indicated by the time range.

Described below is an example of data in the first row of the non-countermeasure-target list shown in FIG. 8. The example of the data indicates that the client boundary router 110 has passed "3000" packets having "x. y. z. 100" as the IP address of the source, "l. m. n. 50" as the IP address of the destination, and "53" as the port number of the destination at the time of "10:00-10-10".

The column of the "number of packets" in the non-countermeasure-target list shown in FIG. 8 shows that the values of the column are "30000", "20000", and "10000" sequentially from the top, and each record is arranged in the ascending order of the "appropriate countermeasure execution rate".

A button icon of "take countermeasures" is provided at the lower portion of the countermeasure-under-execution list. When the button icon is clicked after selecting the traffic determined to have mistakenly not been processed by a false-negative malfunction of the IDS 120 from each type of traffic for which the countermeasures against unauthorized access are not taken in the non-countermeasure-target list by a user of the service for preventing unauthorized access, that is, a system administrator of the client site 200 in the present embodiment, the countermeasures against unauthorized access can be executed by the client boundary router 110 for the selected traffic.

Described below is the procedure of the process performed by each component by executing the unauthorized access countermeasure program 140 at the unauthorized access countermeasure site 130.

At the unauthorized access countermeasure site 130, the procedure of controlling unauthorized access countermeasures, the UI procedure of countermeasures against unauthorized access, the traffic monitor procedure, the unauthorized access notification procedure, the procedure of recording countermeasures against unauthorized access, and the procedure of taking countermeasures against unauthorized access described below are performed in parallel.

Figure 9:
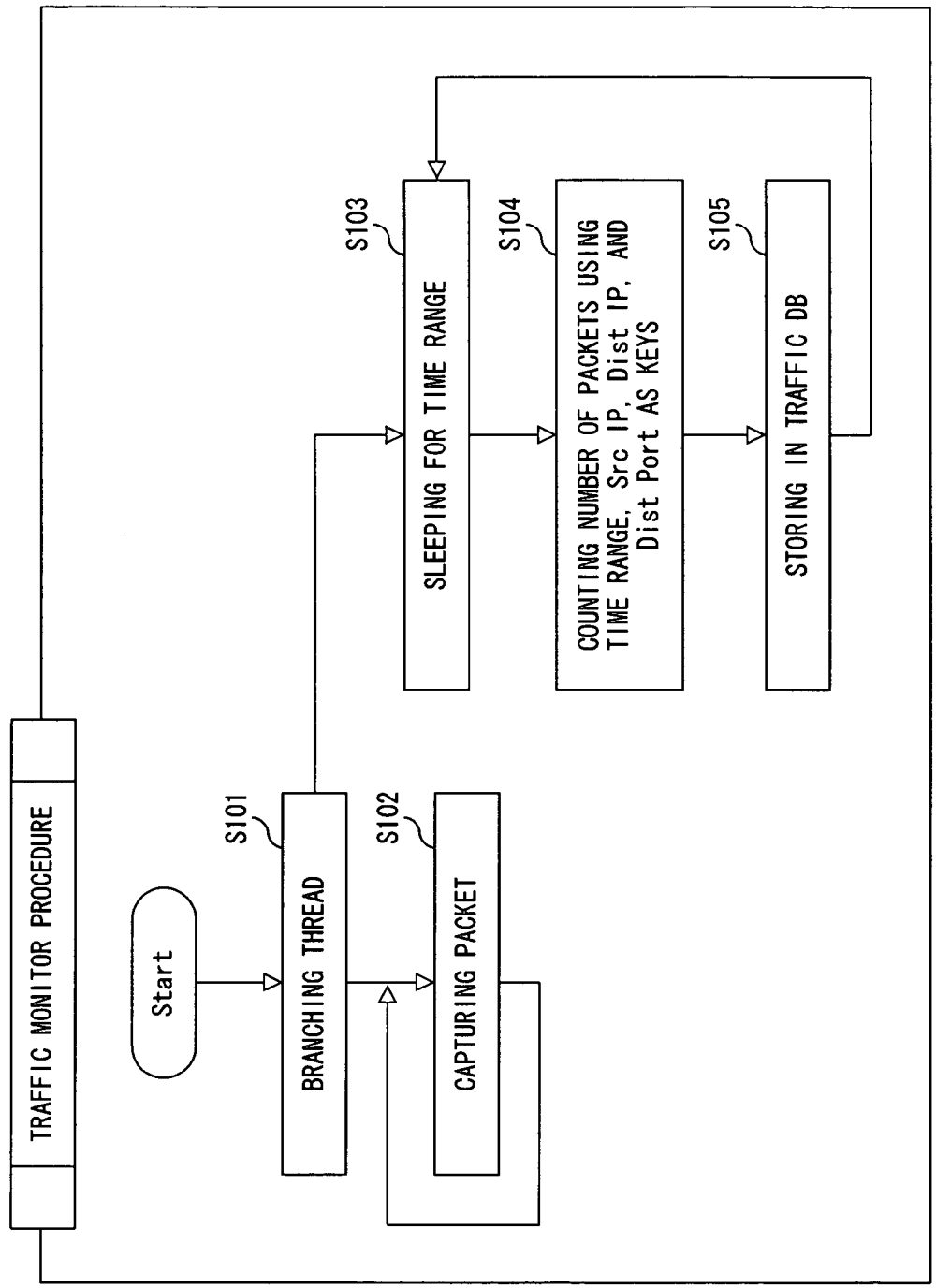
FIG. 9 shows the contents of the procedure of monitoring the traffic according to the first embodiment of the present invention.

First described is the procedure shown in FIG. 9. FIG. 9 is a flowchart of the contents of the traffic monitor procedure performed by the traffic monitor engine 145.

First, a thread is branched in S101 while the iterative procedure in S102 and the iterative procedure from S103 to S105 are performed.

In S102, the packet which is the traffic passed by the client boundary router 110 is captured. Afterwards, the procedure in S102 is repeated, and all packets passed by the client boundary router 110 are captured.

In S103, the execution of the thread from S103 to S105 sleeps for a predetermined time range, for example, for 10 minutes. Then, when a predetermined time range passes, control is passed to the procedure in S104.

In S104, the number of packets captured in the process in S102 is counted using the time range, Src IP, Dist IP, and Dist Port as keys. In S105, the data indicating the result of counting is stored as monitor information in the traffic DB 151. After completing the procedure in S105, control is returned to the procedure in S103, and the above-mentioned procedures are repeated.

The contents shown in FIG. 10 are explained below. FIG. 10 shows the data structure of the traffic DB 151 storing the data in the procedure in S105. As shown in FIG. 10, the traffic DB 151 has the fields of "time range", "Src IP", "Dist IP", "Dist Port", and "Count".

The time range is a set of a starting time and a stop time in which the number of packets is counted.

Src IP is an IP address of the source indicated in the packet to be counted.

Dist IP is an IP address of the destination indicated in the packet to be counted.

Dist Port is a port number of the destination indicated in the packet to be counted.

Count indicates the number of packets to be counted. The packets have been passed by the client boundary router 110 within the time indicated by the "time range".

In the data example shown in FIG. 10, the record in the first row indicates that "1456" packets having "202.248.20.254" as the IP address of the source, "202.248.20.68" as the IP address of the destination, and "80" as the port number of the destination have been passed by the client boundary router 110 within the time of "10:00-10:10".

By performing the procedure of the above-mentioned traffic monitor, the packets passed by the client boundary router 110 are monitored.

Described below is the flowchart shown in FIG. 11. FIG. 11 is the flowchart of the contents of the procedure of unauthorized access notification performed by the unauthorized access notification engine 143.

In step S201, an unauthorized access event is checked on the IDS 120. In step S202, it is determined whether or not unauthorized access has been detected by the IDS 120. As a result, if it is determined that unauthorized access has been detected (if the determination result is YES), then control is passed to the procedure in S203. If it is determined that unauthorized access has not been detected (if the determination result is NO), then control is returned to the procedure in S201, and the above-mentioned procedure is repeated.

In S203, a notification of the detected unauthorized access is issued to the unauthorized access countermeasure control engine 141. Then, control is returned to the procedure in S201, and the above-mentioned procedure is repeated.

Described below is the data format shown in FIG. 12. FIG. 12 shows the data format of a notification of unauthorized access issued to the unauthorized access countermeasure control engine 141 in the procedure in step S203. As shown in FIG. 12, the unauthorized access notification can include the information about "detected ID", "action", "start of time range", "end of time range", "type of attack", "organization name", "related ISP", "target protocol", "Src IP", "Dist IP", "Dist Port", "number of unauthorized packets", "name of attack tool", "appropriate countermeasure execution rate", and "countermeasure execution method".

The "detected ID" is a unique identifier assigned to the unauthorized access by an IDS each time unauthorized access is detected, and the detected ID can be an index for individual designation of a DDOS attack.

The "action" indicates the status of the countermeasures against the detected unauthorized access, and can be either "countermeasure execution" or "countermeasure suspension".

The "start of time range" and the end of time range" indicate the date and time on which a packet related to unauthorized access is first detected, and the date and time on which a predetermined time (for example, 10 minutes) has passed from the date and time of the first detection. In the example shown in FIG. 12, the date and time is indicated by Greenwich Mean Time (GMT).

The "type of attack" indicates the detailed type of DDoS attack of the detected unauthorized access. The "organization name" is the name of an organization indicates the name of an organization to which the system belongs.

The "related ISP" indicates the name of the ISP to which the organization of the system being attacked by the detected unauthorized access belongs.

The "target protocol" is a protocol used for connection to a system being attacked by the detected unauthorized access.

"Src IP" is an IP address of the source indicated in the packet related to the detected unauthorized access.

"Dist Port" is a port number of the destination indicated in the packet related to the detected unauthorized access.

The "number of unauthorized packets" indicates the number of packets related to the unauthorized access specified by the detected ID.

The "name of attack tool" is the name of the DDOS attack estimated to be used in the detected unauthorized access.

The "appropriate countermeasure execution rate" is described above, and indicates the countermeasures against the detected unauthorized access.

The countermeasures execution method indicates the method for the countermeasures to be taken against the detected unauthorized access.

In the examples of data shown in FIG. 12, the example 1 is described below. The data indicates that the unauthorized access specified by the detected ID of "00-00-0E-82-2E-74-001" of an attack of "TCP Syn Flood" detected at "2003/2/116:01:16", the attack is performed according to the "TCP" protocol to the "Company A" belonging to "ISP ABC", the attacker is assumed to use an attack tool of "TFN2K", and "156789" packets having "10.4.120.Z" as the IP address of the source, "192.168.X.Y" as the IP address of the destination, and "80" as the destination port number have been transmitted by "2003/2/116:11:16". The countermeasures using the "ACL filter" are taken against the unauthorized access. The appropriate countermeasure execution rate of the detected unauthorized access is "80%", and the instruction to perform "countermeasure execution" is currently specified.

In the unauthorized access notification generated and transmitted in the procedure in S203 shown in FIG. 11, "action" is set as "countermeasure execution", and nothing is set for the "appropriate countermeasure execution rate" and the "countermeasure execution method" (for example, as null data).

By performing the above-mentioned unauthorized access notification procedure, the contents of the detection of the unauthorized access to the client site 200 by the IDS 120 are announced to the unauthorized access countermeasure control engine 141.

Figure 13:
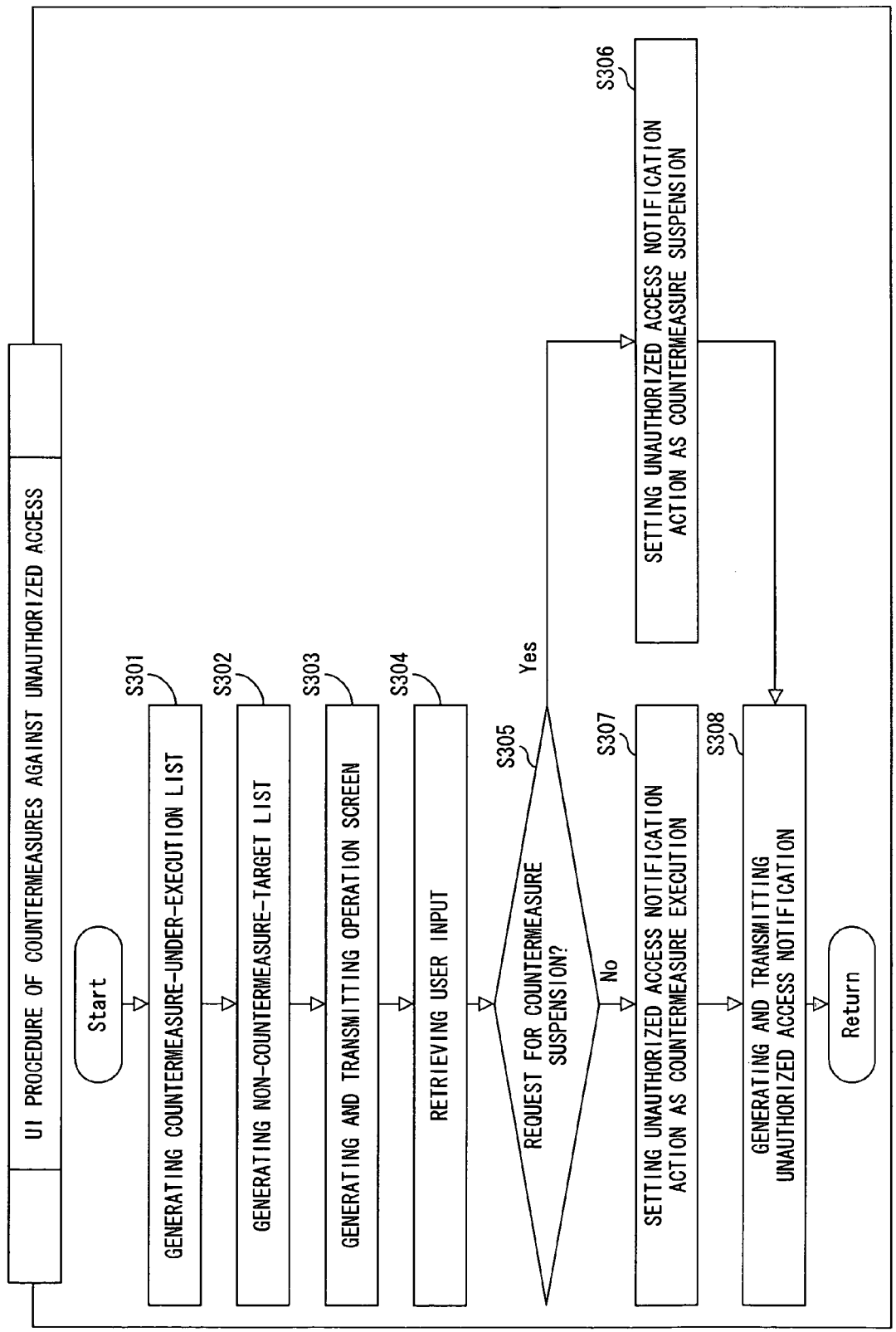
FIG. 13 shows the contents of the procedure of an unauthorized access UI according to the first embodiment of the present invention.

Described below is the flowchart shown in FIG. 13. FIG. 13 is a flowchart of the contents of the UI procedure of countermeasures against unauthorized access performed by the unauthorized access countermeasure UI engine 142.

The procedure is started by the system administrator, etc. of the client site 200 by performing the execution request of the procedure to the unauthorized access countermeasure site 130 by operating, for example, the Web browser using the unauthorized access countermeasure service user terminal 202.

First in S301, the record of the operation of each session performed at the unauthorized access countermeasure site 130 is obtained from the Log DB 152. Based on the record, the appropriate countermeasure execution rate of each type of traffic for which the countermeasures against unauthorized access being executed by the client boundary router 110 are taken is calculated by the above-mentioned equation, and each type of traffic is arranged in the ascending order of the calculated appropriate countermeasure execution rate, thereby generating the countermeasure-under-execution list. At this time, the contents of the "appropriate countermeasure execution rate" of the unauthorized access notification related to the corresponding traffic are updated.

In S302, the record of the traffic passed by the client boundary router 110 is obtained from the traffic DB 151. Based on the record, a non-countermeasure-target list is generated such that the packet which is the traffic passed by the client boundary router 110 is arranged for each type in the descending order of the number of packets in the time range.

In S303, the countermeasure-under-execution list generated in S301 and the non-countermeasure-target list generated in S302 are arranged, and the button icons of the above-mentioned "countermeasure suspension" and the "countermeasure execution" are arranged, so that the operation screen of service for preventing unauthorized access as shown in FIG. 8 is generated, and the screen data representing the operation screen is transmitted to the unauthorized access countermeasure service user terminal 202.

Upon receipt of the screen data, the unauthorized access countermeasure service user terminal 202 displays the operation screen using the function of the Web browser. The system administrator, etc. of the client site 200 refers to the operation screen in the order of the list, and determines whether or not there is an error of execution/non-execution of unauthorized access due to a malfunction of the IDS 120.

The traffic of each type is arranged in the ascending order of the appropriate countermeasure execution rate in the countermeasure-under-execution list because it is considered that a larger number of false-negative malfunctions have occurred for the traffic appearing faster in the ascending order, that is, having a lower appropriate countermeasure execution rate. Therefore, it is determined whether or not mis-execution has occurred in the order of higher possibility of mis-execution of countermeasures against unauthorized access, thereby quickly performing appropriate countermeasures against unauthorized access.

The packet which is traffic of each type is arranged in the non-countermeasure-target list in the descending order of the number passed by the client boundary router 110 in a unit time because it is considered that countermeasures against unauthorized access can be quickly and effectively performed by determining the presence/absence of the status of failure in performing appropriate countermeasures against unauthorized access, that is, the occurrence of a malfunction in the descending order of the influence of the occurrence of false-positive malfunctions.

If an error is detected as a result of the determination of the system administrator, etc., then the system administrator, etc. selects the item of an error from the countermeasure-under-execution list or the non-countermeasure-target list displayed on the operation screen, and the button icon of "countermeasure suspension" or "countermeasure execution" is clicked. Then, the selection information about the item and the type information of the clicked button icon are transmitted as user input from the unauthorized access countermeasure service user terminal 202 to the unauthorized access countermeasure site 130.

In S304, the user input transmitted from the unauthorized access countermeasure service user terminal 202 is retrieved. In S305, it is determined whether or not the type information about the clicked button icon in the user input is the button icon of "countermeasure suspension". If the determination result in S305 is YES, then the contents of the "action" of the unauthorized access notification related to the selection information of the item in the user input is "countermeasure suspension" in S306. If the determination result in S305 is NO, that is, the type information about the button icon clicked in the user input indicates "countermeasure execution", then the contents of the "action" of the unauthorized access notification related to the selection information of the item in the user input is "countermeasure execution" in S307.

In S308, the unauthorized access notification whose contents have been updated in the procedure in S306 or S307 is transmitted to the unauthorized access countermeasure control engine 141.

By performing the above-mentioned UI procedure of countermeasures against unauthorized access, an instruction to correct the countermeasures against unauthorized access by the system administrator, etc. of the client site 200 is recognized by the unauthorized access countermeasure control engine 141.

Figure 14:
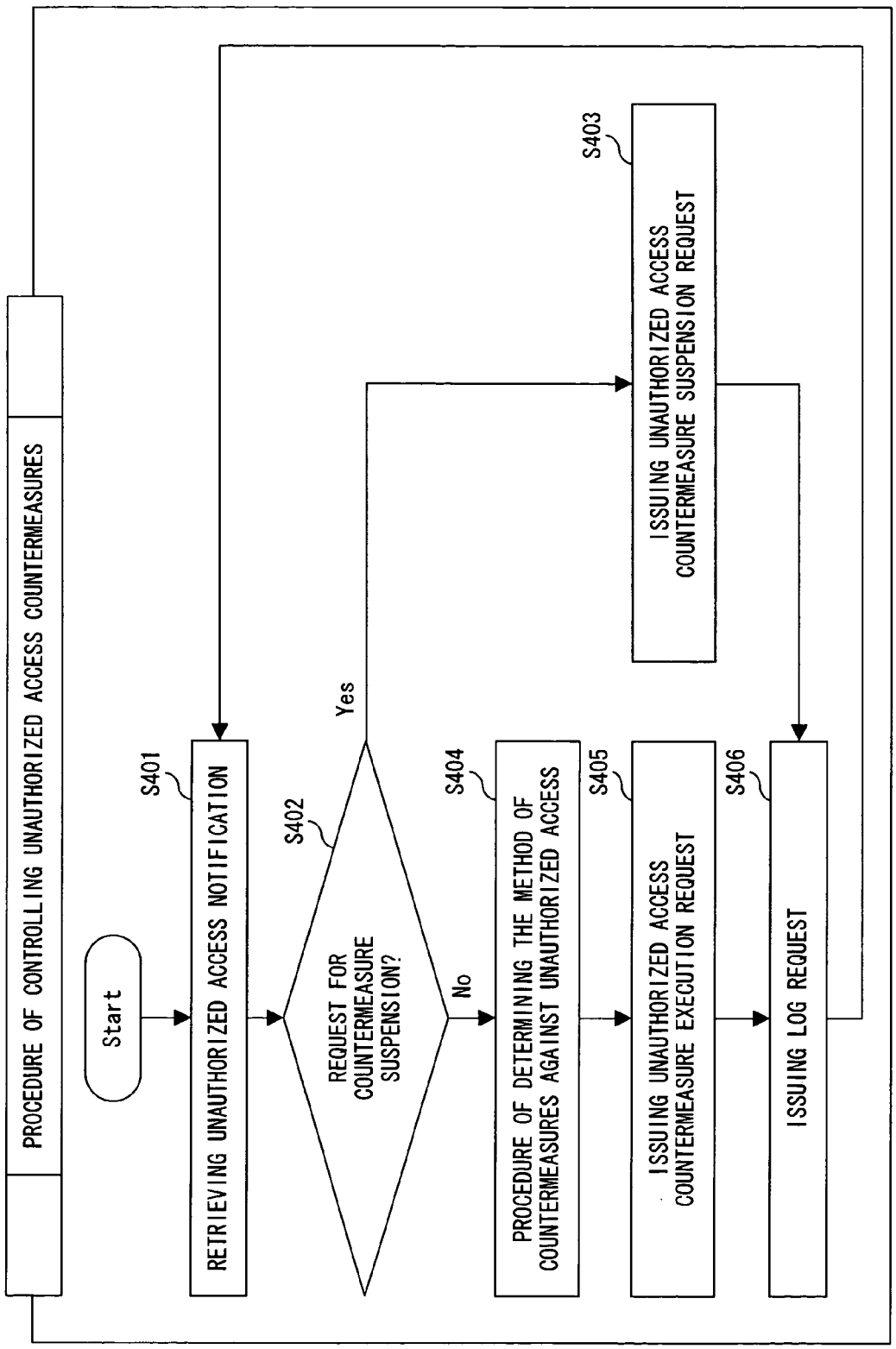
FIG. 14 shows the contents of the procedure of controlling unauthorized access countermeasures according to the first embodiment of the present invention.

Described below is the flowchart shown in FIG. 14. FIG. 14 is a flowchart of the contents of the procedure of controlling unauthorized access countermeasures performed by the unauthorized access countermeasure control engine 141.

First, in S401, an unauthorized access notification transmitted from the unauthorized access notification engine 143 or the unauthorized access countermeasure UI engine 142 is retrieved.

In S402, it is determined whether or not the contents of the "action" of the unauthorized access notification retrieved in the procedure in S401 is "countermeasure suspension". If the determination result is YES, an unauthorized access countermeasures execution request is transmitted to the unauthorized access countermeasure execution engine 144 in S403, and then control is passed to the procedure in S406.

On the other hand, if the determination result in S402 is NO, that is, the contents of the "action" of the unauthorized access notification retrieved in the procedure in S401 is "countermeasure execution", then the procedure of determining the method of countermeasures against unauthorized access is performed in S404, and an unauthorized access countermeasures execution request is transmitted to the unauthorized access countermeasure execution engine 144 in S405. The procedure of determining the method of countermeasures against unauthorized access is described later.

In S406, a log request is transmitted to the unauthorized access countermeasure record control engine 146 and a request to record the contents of the process performed in the procedure in the above-mentioned S403 or S404 to S405 transmitted is issued, and then control is returned to the procedure in S401, and the above-mentioned procedure is repeated. When the notification is obtained in the procedure in S401 and the procedure in S404 is performed, the unauthorized access notification whose contents have been updated is added to the log request.

Figure 15:
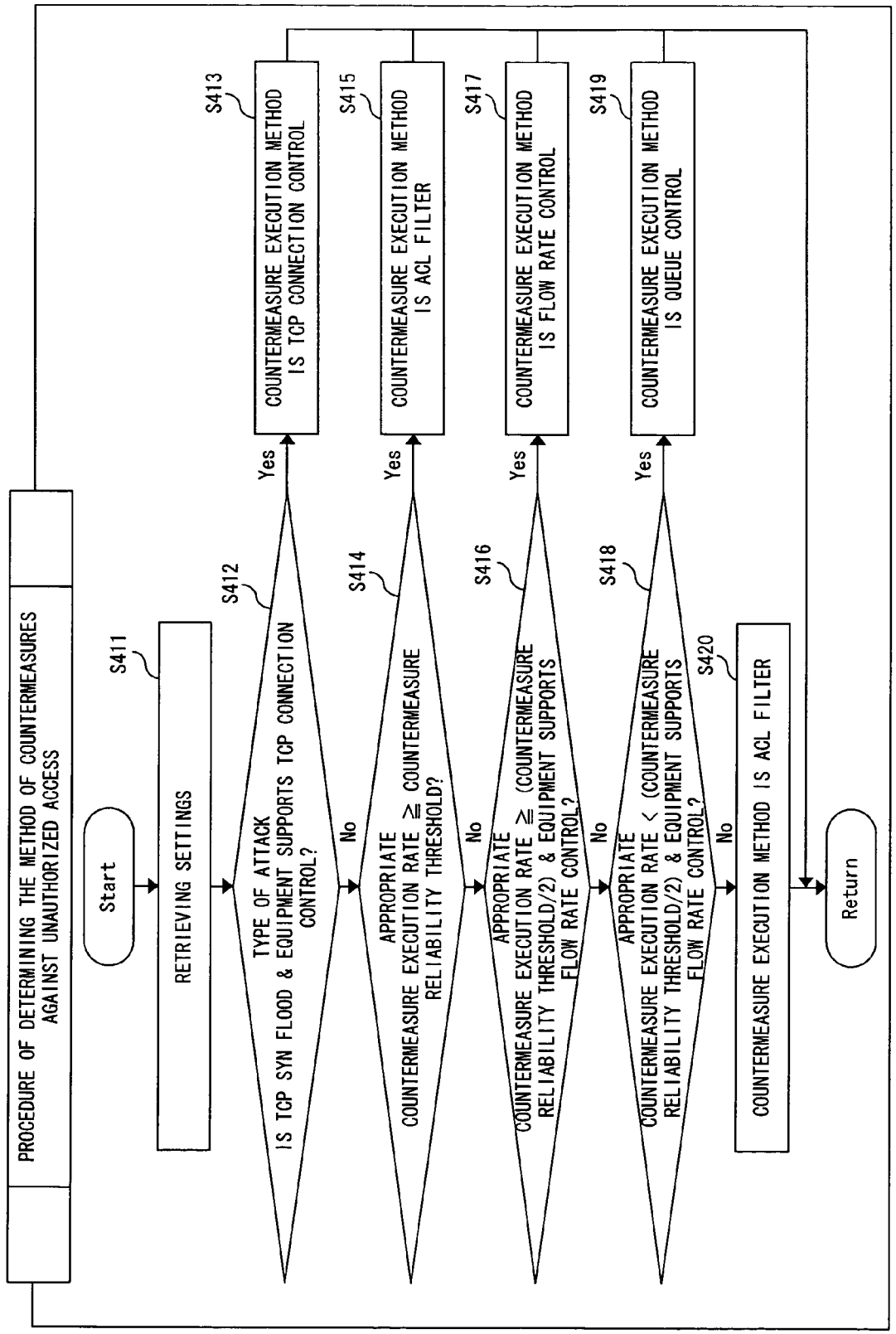
FIG. 15 shows the contents of the procedure of determining countermeasures against unauthorized access.

Described below is the flowchart shown in FIG. 15. FIG. 15 is a flowchart of the contents of the procedure of determining the method of countermeasures against unauthorized access which is the procedure of S404 shown in FIG. 14.

First, in S411, the setting information 150 is retrieved. In the subsequent procedure in FIG. 15, the determination as to what countermeasures against unauthorized access the countermeasure execution equipment (the client boundary router 110 in the present embodiment) has is made based on the contents of the "router type" and the "router OS" in the inherent information about the countermeasure execution equipment in the setting information 150.

In S412, the contents of the "type of attack" in the unauthorized access notification retrieved in the procedure of S401 shown in FIG. 14 are "TCP Syn Flood", and it is determined whether or not the countermeasure execution equipment has the above-mentioned TCP connection control capability. If the determination result is YES, it is determined that the countermeasures against the access relating to the unauthorized access notification is taken by the TCP connection control capability, and the item of the "countermeasure execution method" in the unauthorized access notification is set as the "TCP connection control" in S413. Then, the procedure of determining the method of countermeasures against unauthorized access terminates, and control is returned to the procedure shown in FIG. 14.

It is considered that in the determination the optimum countermeasures against the attack of the TCP Syn Flood can be taken by the TCP connection control capability which is an exclusive defensive capability against the attack.

On the other hand, when the determination result in S412 is NO, the "appropriate countermeasure execution rate" in the unauthorized access notification retrieved in the procedure in S401 shown in FIG. 13 is compared in numeric with the "countermeasure reliability threshold" in the setting information 150, and it is determined whether or not the "appropriate countermeasure execution rate" is equal to or higher than the "countermeasure reliability threshold" in S414. If the determination result is YES, it is determined that the countermeasures against the access related to the unauthorized access notification are taken using the above-mentioned ACL filter, and the item of the "countermeasure execution method" in the unauthorized access notification is set as an "ACL filter" in S415. Then, the procedure of determining the method of countermeasures against unauthorized access terminates, and control is returned to the procedure shown in FIG. 14.

On the other hand, when the determination result in S414 is NO, it is determined whether or not the above-mentioned "appropriate countermeasure execution rate" is set to the value equal to or larger than ½ of the "countermeasure reliability threshold" in the setting information 150 and the countermeasure execution equipment has the above-mentioned flow rate control capability in S416. If the determination result is YES, it is determined that the countermeasures against the access related to the unauthorized access notification are taken using the flow rate control capability, and the item of the "countermeasure execution method" in the unauthorized access notification is set as "flow rate control" in S417. Then, the procedure of determining the method of countermeasures against unauthorized access terminates, and control is returned to the procedure shown in FIG. 14.

When the determination result in S416 is NO, it is determined whether or not the above-mentioned "appropriate countermeasure execution rate" is set to the value equal to or larger than ½ of the "countermeasure reliability threshold" in the setting information 150 and the countermeasure execution equipment has the above-mentioned queue control capability in S418. If the determination result is YES, it is determined that the countermeasures against the access related to the unauthorized access notification are taken using the queue control capability, and the item of the "countermeasure execution method" in the unauthorized access notification is set as "queue control" in S419. Then, the procedure of determining the method of countermeasures against unauthorized access terminates, and control is returned to the procedure shown in FIG. 14.

If the determination result in S418 is NO, it is determined that the countermeasures against the access related to the unauthorized access notification are taken using the above-mentioned ACL filter, and the item of the "countermeasure execution method" in the unauthorized access notification is set as an "ACL filter" in S420. Then, the procedure of determining the method of countermeasures against unauthorized access terminates, and control is returned to the procedure shown in FIG. 14.

The above-mentioned procedure is the procedure of determining the method of countermeasures against unauthorized access.

The reason why the ACL filter, the flow rate control, and the queue control are determined as the method of countermeasures against unauthorized access in the order from the largest value depending on the level of the appropriate countermeasure execution rate.

First, that the appropriate countermeasure execution rate is high enough to be sufficiently reliable refers to that there is a strong possibility that the traffic of the type indicates unauthorized access. Therefore, it is optimum to use an ACL filter which discards the type of traffic without fail.

Between the flow rate control and the queue control, the flow rate control is more appropriate in that unauthorized access can be more frequently discarded. However, since when the appropriate countermeasure execution rate is low, there is a stronger possibility that the type of traffic refers to normal access. Therefore, the queue control capable of passing larger amount of normal access can be considered to be more appropriate because it reduces the damage of the countermeasures against unauthorized access. As a result, in selecting one of the above-mentioned two types of control, the flow rate control is selected when the appropriate countermeasure execution rate is higher, and the queue control is selected when the appropriate countermeasure execution rate is lower.

The value of ½ of the "countermeasure reliability threshold" is used in the above-mentioned procedure of determining the method of countermeasures against unauthorized access as the reference in comparing the appropriate countermeasure execution rates for selection between the flow rate control and the queue control. However, the value of "½" can be any other values from 0 to 1, or the value exclusive as the determination reference can be set as the setting information 150.

Described below is the flowchart shown in FIG. 16. FIG. 16 is a flowchart of the contents of the procedure of taking countermeasures against unauthorized access performed by the unauthorized access countermeasure execution engine 144.

In S501, a request about the countermeasures against unauthorized access transmitted from the unauthorized access countermeasure control engine 141 is obtained. The request is transmitted from the unauthorized access countermeasure control engine 141 in the procedure in S403 or S405 shown in FIG. 14.

In S502, the setting information 150 is retrieved, and the information about the "router type", "router IP", and "router PW" in the inherent information about the ISP 100 is obtained.

In S503, the unauthorized access notification corresponding to the request about the unauthorized access notification corresponding to the request about the countermeasures against unauthorized access obtained in the procedure in S501 is referred to. According to the contents of the "action" in the notification, the countermeasures against unauthorized access are executed, or the settings for stopping the countermeasures against unauthorized access being executed are made for the client boundary router 110. When the countermeasures against unauthorized access are performed, the settings for performing the unauthorized access notification in the method indicated by the "countermeasure execution method" of the unauthorized access notification are provided for the client boundary router 110.

Each piece of information obtained in the procedure in S502 is used for the settings in the client boundary router 110, and the countermeasures against unauthorized access is started or suspended in the determination method based on the settings in the client boundary router 110.

In S504, it is determined whether or not the settings made for the client boundary router 110 in the procedure in S503 indicates the execution of the countermeasures against unauthorized access. If the determination result is YES, a thread is branched in S505, the iterative procedures is performed from S501 to S505, and the procedures from S506 to S510 are performed. On the other hand, if the determination result in S504 is NO, that is, if the settings made for the client boundary router 110 indicate the suspension of the countermeasures against unauthorized access, then control is returned to the procedure in S501, and the above-mentioned procedures are repeated.

In S506, the status of the countermeasures against unauthorized access set for the client boundary router 110 in the procedure in S503 is retrieved.

In S507, it is determined whether or not the status of the countermeasures indicates the suspension of the countermeasures against unauthorized access. If the determination result is YES, the thread from S506 to S510 branched in the procedure in S505 immediately terminates.

On the other hand, if the determination result is NO, that is, if the settings made for the client boundary router 110 in the procedure in S503 indicate the execution of the countermeasures against unauthorized access, then an inquiry is issued to the IDS 120 in S508, and it is checked whether or not a packet which is unauthorized access against which the countermeasures are taken has not continuously been received by the client boundary router 110. In response to the inquiry, it is determined whether or not the time as a reply from the IDS 120 has exceeded the "countermeasure release reliability threshold" indicated by the setting information 150. If the determination result is YES, that is, if a packet which is unauthorized access has not been continuously received over a countermeasure release reliability threshold, then control is passed to the procedure in S509. If the determination result is NO, that is, a packet which is unauthorized access has continuously been received, or the duration in which a packet which is unauthorized access has not been received indicates a value smaller than a countermeasure release reliability threshold, then control is returned to the procedure in S506 and the above-mentioned procedure is repeated.

In S509, the client boundary router 110 is controlled, and the countermeasures against unauthorized access set in the procedure in S503 are released.

In S510, a log request is transmitted to the unauthorized access countermeasure record control engine 146, and a request to record the release of the execution of countermeasures is issued. An unauthorized access notification referred to in the procedure in S503 is added to the log request.

After the procedure in S510, the thread in S506 through S510 in which a branch is made terminates.

By the above-mentioned procedure of taking countermeasures against unauthorized access, the client boundary router 110 executes, suspends, and releases the countermeasures against unauthorized access.

Figure 17:
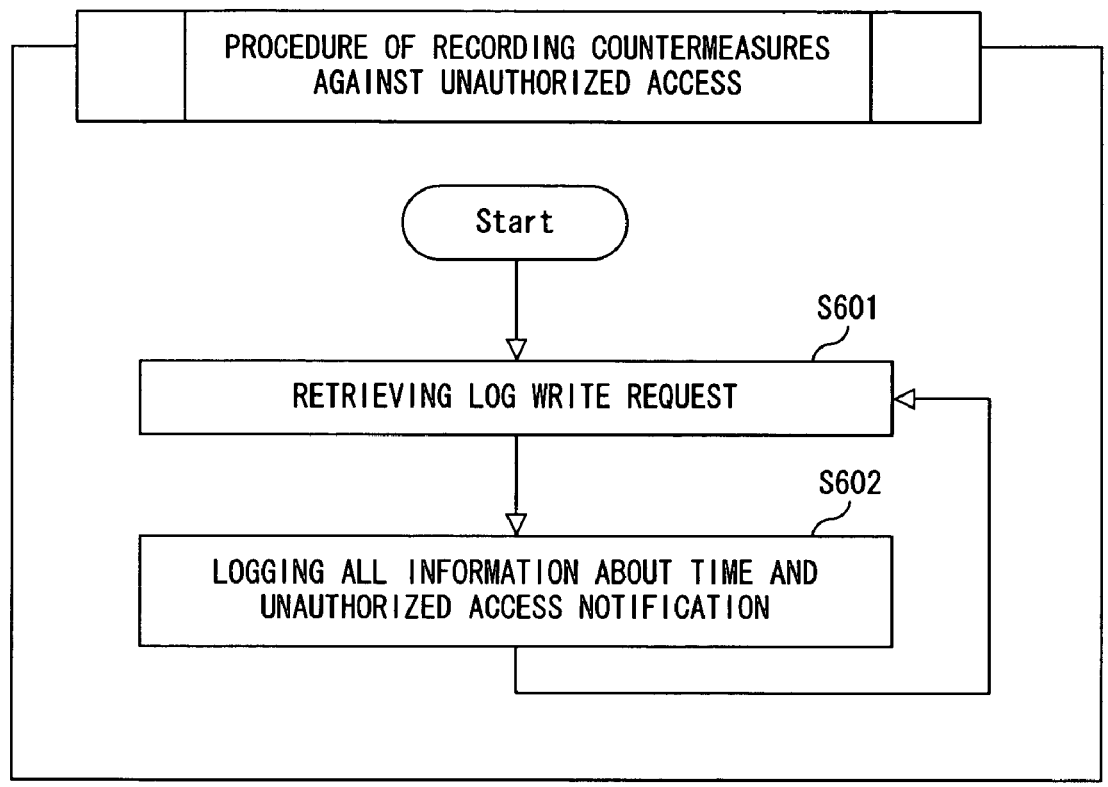
FIG. 17 shows the contents of the procedure of recording unauthorized access according to the first embodiment of the present invention.

Described below is the flowchart shown in FIG. 17. FIG. 17 is a flowchart of the contents of the procedure of recording countermeasures against unauthorized access performed by the unauthorized access countermeasure record control engine 146.

First, in S601, a log request transmitted from the unauthorized access countermeasure control engine 141 or the unauthorized access countermeasure execution engine 144 is retrieved.

In S602, the current time and the contents of the unauthorized access notification added to the retrieved log request are recorded in the log, and stored in the Log DB 152.

After the procedure in S602, control is returned to the procedure in S601, and afterwards, the procedure of retrieving the log request and recording data to the log is repeated.

By the above-mentioned procedure of recording countermeasures against unauthorized access, the system administrator of the ISP 100 of the system can grasp the status of the countermeasures against the unauthorized access for the client site 200 from the record of the history.

Embodiment 2

In the above-mentioned embodiment 1, an example of executing countermeasures against unauthorized access at the boundary between the client site 200 which is the target of the attack of unauthorized access and the ISP 100 of the system has been explained. In the embodiment 2 described below, an example of executing the countermeasures against unauthorized access in a place closest possible to the source of unauthorized access is explained.

Figure 18:
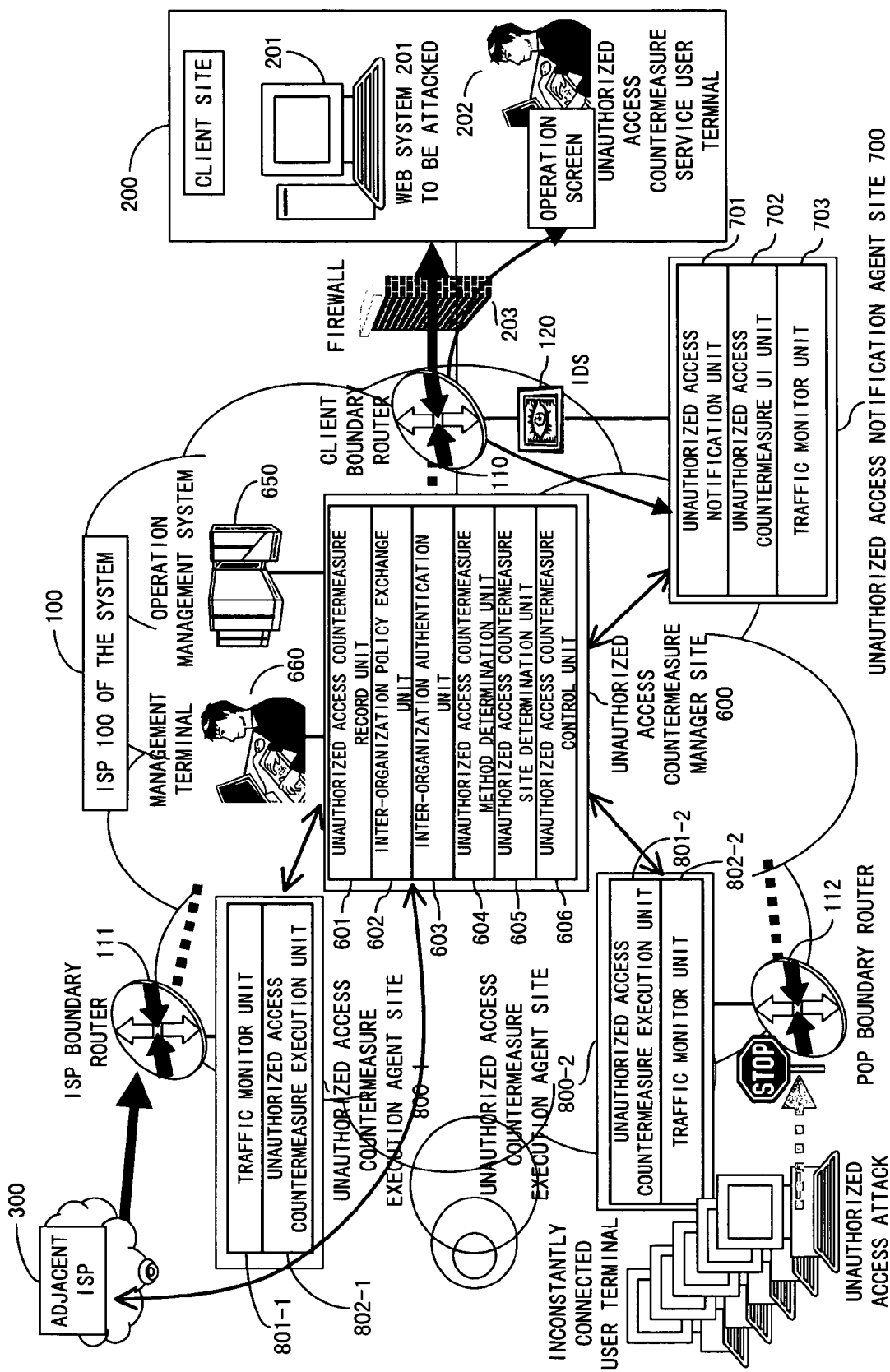
FIG. 18 shows the second embodiment of the configuration of the unauthorized access prevention program embodying the present invention.

FIG. 18 shows the second example of the configuration of the unauthorized access prevention system embodying the present invention. In FIG. 18, the component assigned the same reference numeral as in the first example shown in FIG. 4 is the same as that shown in FIG. 4, and the overlapping explanation of the component is omitted.

The unauthorized access prevention system shown in FIG. 18 is configured by an unauthorized access countermeasure manager site 600, an unauthorized access notification agent site 700, and unauthorized access countermeasure execution agent sites 800-1 and 800-2.

The unauthorized access countermeasure manager site 600 comprises an unauthorized access countermeasure record unit 601, an inter-organization policy exchange unit 602, an inter-organization authentication unit 603, an unauthorized access countermeasure method determination unit 604, an unauthorized access countermeasure site determination unit 605, and an unauthorized access countermeasure control unit 606.

The unauthorized access countermeasure record unit 601 records the history of the operation of each session relating to the execution, suspension, release, etc. of the countermeasures against unauthorized access using countermeasure execution equipment.

The inter-organization policy exchange unit 602 exchanges network operation security policies between the ISP 100 of the unit and the ISP of another unit, for example the adjacent ISP 300.

The inter-organization authentication unit 603 performs mutual authentication for protection against an information leak when information is exchanged between the ISP 100 of the unit and another ISP, for example, the adjacent ISP 300. The connection protocol for mutual authentication with the source can be, for example, HTTPS (hypertext transfer protocol security) protocol, and the authentication system used in the mutual authentication can be, for example, a public key infrastructure (PKI), and an electronic certificate can be, for example, the recommendation X.509 of the International Telecommunication Union (ITU).

The unauthorized access countermeasure method determination unit 604 determines an appropriate method of countermeasures against unauthorized access according to the information indicated in the notification of an attack of unauthorized access (unauthorized access notification) to the Web system 201 transmitted from the unauthorized access notification agent site 700 and detected by the IDS 120.

The unauthorized access countermeasure site determination unit 605 determines the site at which the countermeasures are taken to protect the Web system 201 against unauthorized access to the Web system 201.

The unauthorized access countermeasure control unit 606 manages and controls various sessions performed at the unauthorized access countermeasure manager site 600.

The operation management system 650 is arranged by the ISP 100 of the system for management of the operation of the ISP 100 of the system, manages the configuration of the ISP 100, manages the traffic, manages the damage, manage the account, etc. of the system. The operation management system 650 communicates various data in cooperation with the unauthorized access countermeasure manager site 600. Therefore, the operation management system 650 contains information about the router type, router OS, router IP, router ID, and router PW of each client boundary router 110, ISP boundary router 111, and POP boundary router 112 provided for the ISP 100 of the system.

An ISP management terminal 660 provides a system administrator of the ISP 100 of the system with a user interface for the unauthorized access prevention system, and is a computer having a CPU, memory, a display, a communications interface, etc. The ISP management terminal 660 can be, for example, a personal computer, a personal data assistant (PDA), etc.

The unauthorized access notification agent site 700 comprises an unauthorized access notification unit 701, an unauthorized access countermeasure UI unit 702, and a traffic monitor unit 703.

The unauthorized access notification unit 701 cooperates with the IDS 120 to issue a notification of an attack of unauthorized access (unauthorized access notification) to the Web system 201 detected by the IDS 120 to the unauthorized access countermeasure manager site 600.

The unauthorized access countermeasure UI unit 702 provides a user interface (UI) which is an operation screen displayed on the unauthorized access countermeasure service user terminal 202 operated by the system administrator of the client site 200 connected to the ISP 100 of the system through the firewall 203. The UI is similar to that provided by the unauthorized access countermeasure UI unit 132 shown in FIG. 4, and provides, for example, the user interface screen shown in FIG. 8.

The traffic monitor unit 703 monitors the traffic passed by the client boundary router 110, and collects information about the traffic.

The unauthorized access countermeasure execution agent site 800-1 comprises a traffic monitor unit 801-1 and an unauthorized access countermeasure execution unit 802-1.

The traffic monitor unit 801-1 monitors the traffic passed by the ISP boundary router 111, and collects the information about the traffic.

The unauthorized access countermeasure execution unit 802-1 controls the ISP boundary router 111 to allow it to execute the countermeasures against unauthorized access to the Web system 201 into the ISP 100 of the system from the adjacent ISP according to the instruction from the unauthorized access countermeasure manager site 600, or release the countermeasures being executed.

FIG. 18 shows only one adjacent ISP 300, and there if only one ISP boundary router 111 in the ISP 100 of the system. However, there is a plurality of adjacent ISPs 300, a plurality of countermeasure execution status screen generation units 11 are provided in the ISP 100 of the system corresponding to each adjacent ISP 300, and the unauthorized access countermeasure execution agent site 800-1 centrally manages them.

The unauthorized access countermeasure execution agent site 800-2 comprises a traffic monitor unit 801-2 and an unauthorized access countermeasure execution unit 802-2.

The traffic monitor unit 801-2 monitors the traffic passed by the POP boundary router 112, and collects the information about the traffic.

The unauthorized access countermeasure execution unit 802-2 controls the POP boundary router 112, and executes or release the execution of the countermeasures against the unauthorized access to the Web system 201 entering the ISP 100 of the system from the inconstantly connected user terminal 400 at an instruction from the unauthorized access countermeasure manager site 600.

As described above, the unauthorized access countermeasure execution agent site 800-1 and the unauthorized access countermeasure execution agent site 800-2 has the same configuration except different target equipment between the ISP boundary router 111 and the POP boundary router 112. Therefore, for common explanation of them as an unauthorized access countermeasure execution agent site 800, the ISP boundary router 111 and the POP boundary router 112 are referred to as a boundary router 113, and the unauthorized access countermeasure execution agent site 800 is assumed to have a traffic monitor 801 and an unauthorized access countermeasure execution unit 802. The traffic monitor 801 monitors the traffic passed by the boundary router 113, and collects the information about the traffic. The unauthorized access countermeasure execution unit 802 executes or releases the execution of the countermeasures against the unauthorized access to the Web system 201 entering the ISP 100 of the system through the boundary router 113 at an instruction from the unauthorized access countermeasure manager site 600.

Figure 19:
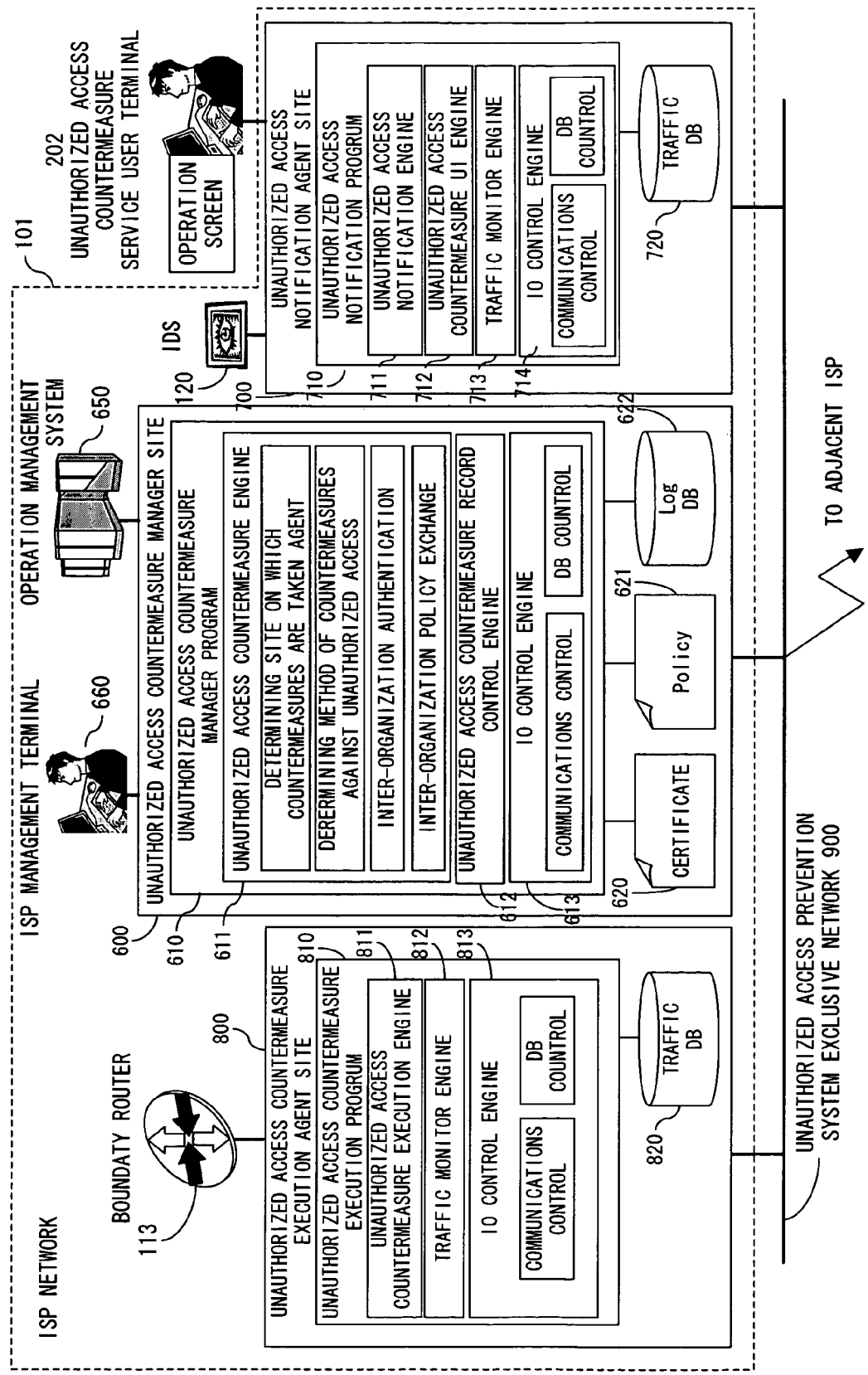
FIG. 19 is a block diagram of the program executed on each site shown in FIG. 18.

The entities of the unauthorized access countermeasure manager site 600, the unauthorized access notification agent site 700, and the unauthorized access countermeasure execution agent site 800 are computers. As shown in FIG. 19, the unauthorized access countermeasure manager program 610 in the unauthorized access countermeasure manager site 600, an unauthorized access notification program 710 in the unauthorized access notification agent site 700, and an unauthorized access countermeasure execution program 810 in the unauthorized access countermeasure execution agent site 800 are executed to allow each site to have the configuration shown in FIG. 18.

In FIG. 19, an unauthorized access prevention system exclusive network 900 is a communications network different from an ISP network 101. In addition to the unauthorized access prevention system provided in the ISP network 101 for management of the ISP 100 of the system connected to the unauthorized access prevention system exclusive network 900, the unauthorized access prevention system having the configuration similar to that shown in FIG. 19 and provided in the adjacent network managed by the adjacent ISP 300 is also connected to the unauthorized access prevention system exclusive network 900 to communicate various data. The communications of various data among the above-mentioned equipment are performed through the unauthorized access prevention system exclusive network 900 in principle.

When the unauthorized access countermeasure manager program 610 is executed in the unauthorized access countermeasure manager site 600, an unauthorized access countermeasure control engine 611, an unauthorized access countermeasure record control engine 612, and an IO control engine 613 are comprised.

The unauthorized access countermeasure control engine 611 functions as the inter-organization policy exchange unit 602, the inter-organization authentication unit 603, the unauthorized access countermeasure method determination unit 604, the unauthorized access countermeasure site determination unit 605, and the unauthorized access countermeasure control unit 606.

The unauthorized access countermeasure record control engine 612 functions as the unauthorized access countermeasure record unit 601, and records in a log DB 622 the history of the operation of each session relating to the execution, suspension, release, etc. of the countermeasures against unauthorized access in countermeasure execution equipment.

The IO control engine 613 controls the communications of various data with the operation management system 650, the ISP management terminal 660, the unauthorized access notification agent site 700, the unauthorized access countermeasure execution agent site 800, etc., and controls the operation of the log DB 622. The unauthorized access countermeasure manager site 600 has two communications interfaces one of which is connected to the ISP network 101, and the other of which is connected to the unauthorized access prevention system exclusive network 900. However, no routing operation is performed between the two networks. The two communications networks are managed by the IO control engine 613, and uses the unauthorized access prevention system exclusive network 900 for communications of various data with the unauthorized access notification agent site 700 and unauthorized access countermeasure execution agent site 800 so that various data can be communicated although the ISP network 101 cannot be used as a communications path due to the influence of unauthorized access.

A certificate 620 is used in performing inter-orginization authentication by the control of the unauthorized access countermeasure control engine 611 in accordance with, for example, the recommendation X.509 of the International Telecommunication Union (ITU).

A policy 621 is an information file indicating the security policy of the ISP network 101 which is the ISP 100 of the system, and indicates the data of a "countermeasure release time threshold" and a "countermeasure reliability threshold" which is the information about the security policy of the ISP 100 of the system in the information indicated by the setting information 150 in the above-mentioned embodiment 1.

The log DB 622 is a database in which the history of the operation of each session relating to the execution, suspension, release, etc. of the countermeasures against unauthorized access in countermeasure execution equipment is recorded.

When the unauthorized access notification program 710 is executed in the unauthorized access notification agent site 700, an unauthorized access notification engine 711, an unauthorized access countermeasure UI engine 712, a traffic monitor engine 713, and an IO control engine 714 are configured.

The unauthorized access notification engine 711 functions as the unauthorized access notification unit 701.

The unauthorized access countermeasure UI engine 712 functions as the unauthorized access countermeasure UI unit 702.

The traffic monitor engine 713 functions as the traffic monitor unit 703, and stores collected information in a traffic DB 720.

The IO control engine 714 controls the communications of various data with the IDS 120, the unauthorized access countermeasure service user terminal 202, the unauthorized access countermeasure manager site 600, the unauthorized access countermeasure execution agent site 800, etc., and controls the operation of the traffic DB 720.

The unauthorized access notification agent site 700 has two contents interfaces one of which is connected to the ISP network 101, and the other of which is connected to the unauthorized access prevention system exclusive network 900. However, no routing operation is performed between the two networks. The two communications interfaces are managed by the IO control engine 714, and the unauthorized access prevention system exclusive network 900 is used in the communications of various data with the unauthorized access countermeasure manager site 600 and the unauthorized access countermeasure execution agent site 800.

The traffic DB 720 is a database in which the information about the traffic passed by the client boundary router 110 is recorded.

When the unauthorized access countermeasure execution program 810 is executed in the unauthorized access countermeasure execution agent site 800, an unauthorized access countermeasure execution engine 811, a traffic monitor engine 812, and an IO control engine 813 are configured.

The unauthorized access countermeasure execution engine 811 functions as the unauthorized access countermeasure execution unit 802.

The traffic monitor engine 812 functions as the traffic monitor 801, and stores the collected information in a traffic DB 820.

The IO control engine 813 controls the communications of various data with the boundary router 113, the unauthorized access countermeasure manager site 600, the unauthorized access notification agent site 700, etc. and controls the operation of the traffic DB 820.

The unauthorized access countermeasure execution agent site 800 has two communications interfaces one of which is connected to the ISP network 101, and the other of which is connected to the unauthorized access prevention system exclusive network 900. However, no routing operation is performed between the two networks. The two communications interfaces are managed by the IO control engine 813, and the unauthorized access prevention system exclusive network 900 is used in the communications of various data with the unauthorized access countermeasure manager site 600 and the unauthorized access notification agent site 700.

The traffic DB 820 is a database in which the information about the traffic passed by the boundary router 113 is recorded.

The unauthorized access countermeasure manager site 600, the unauthorized access notification agent site 700, and the unauthorized access countermeasure execution agent site 800 shown in FIG. 19 can be configured using a computer having a standard hardware configuration as shown in, for example, FIG. 7. However, as described above, the computer used as the sites has one more communications interface 507 connected to it for connection to the bus 508.

The contents of the process performed by each unit configured by executing various programs shown in FIG. 19 at each site configuring the unauthorized access prevention system shown in FIG. 18 is explained below.

In the unauthorized access prevention system shown in FIG. 18, the traffic monitor procedure, the unauthorized access notification procedure, the UI procedure of countermeasures against unauthorized access, the procedure of controlling unauthorized access countermeasures, the procedure of taking countermeasures against unauthorized access, and the procedure of recording countermeasures against unauthorized access are performed in parallel.

Figure 20:
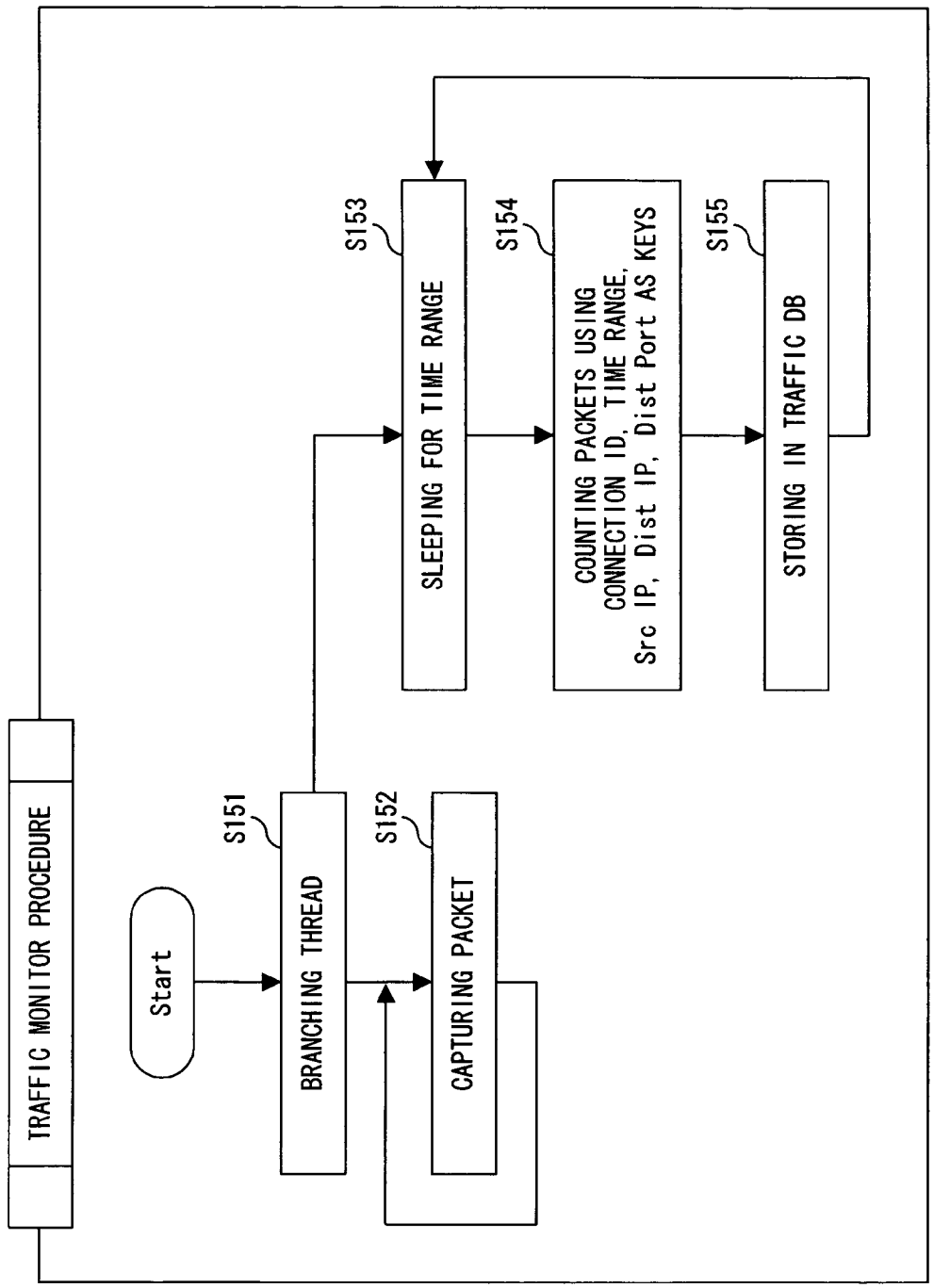
FIG. 20 shows the contents of the procedure of monitoring traffic according to the second embodiment of the present invention.

Described first is the flowchart shown in FIG. 20. FIG. 20 is a flowchart of the contents of the traffic monitor procedure performed in each of the traffic monitor engines 713 and 812.

First, in S151, a thread is branched. The iterative procedure in S152 is performed in one branch, and the iterative procedure in S153 through S155 is performed in the other branch.

In S152, packets which are the traffic passed by the client boundary router 110 (when the procedure is performed by the traffic monitor engine 713) or the boundary router 113 (when the procedure is performed by the traffic monitor engine 812) are captured. Afterwards, the procedure in S152 is repeated, and the packets passed by the client boundary router 110 of the boundary router 113 are all captured.

In S153, the execution of the thread in S153 through S155 is slept (stopped) for a predetermined time range, for example, 10 minutes, and after a predetermined time range has passed, control is passed to the procedure in S154.

In S154, the number of packets captured in the process in S152 is counted using connection ID, time range, Src IP, Dist IP, and Dist Port as keys, and the data indicating the result of counting the number is stored as the monitor information in the traffic DB 720 (when the procedure is performed in the traffic monitor engine 713) or the traffic DB 820 (when the procedure is performed in the traffic monitor engine 812) in S155. After the procedure in S155 has been completed, control is returned to the procedure in S153, and the above-mentioned procedure is repeated.

Described below is the flowchart shown in FIG. 21. FIG. 21 shows the data structure of the traffic DBs 720 and 820 storing the data in the above-mentioned procedure in S155. The data structure shown in FIG. 21 and that in the embodiment 1 are different only in that a field "connection ID" is added to each record, and the same in all other points. Therefore, only the "connection ID" is described below.

The connection ID is an identifier individually assigned to a user of the ISP network 101 managed by the ISP 100 of the system. The relationship between the connection ID and the packet to be counted can be obtained from the operation management system 501 by issuing the Src IP (IP address of the source) indicated in the packet to the operation management system 650.

When the record in the first row in the data example shown in FIG. 21 is explained, it indicates that the user of the ISP network 101 in which "ABC01234" is assigned as a connection ID has led "1456" packets having the IP address of the source of "202.248.20.254", the IP address of the destination of "202.248.20.68" and the destination port number of "80" to the boundary router 113 within the time of "10:00-10:10".

In the traffic DB 820, the above-mentioned data is stored for each boundary router 113.

Described below is the unauthorized access notification procedure performed by the unauthorized access notification engine 711. The contents of the unauthorized access notification procedure are substantially the same as the contents shown in FIG. 11 and performed by the unauthorized access notification engine 143 in the embodiment 1. Since they are different only in that the destination of the unauthorized access notification issued in S203 in the embodiment 2 is the unauthorized access countermeasure manager site 600, the detailed explanation is omitted here. However, the data format of the unauthorized access notification is a little different from that shown in FIG. 12.

Described below is the data format shown in FIG. 22. FIG. 22 shows the data format of the unauthorized access notification transmitted to the unauthorized access countermeasure manager site 600 by the unauthorized access notification engine 711. The information about the "related ISP manager IP", "countermeasure release policy", and "countermeasure reliability policy" is added to the data format shown in FIG. 22 in addition to the items of the data format according to the embodiment 1 shown in FIG. 12. The added information is described below.

The "related ISP manager IP" is an IP address assigned to the unauthorized access countermeasure manager site 600 in the ISP 100 of the system which first receives the unauthorized access notification generated at the unauthorized access notification agent site 700.

The "countermeasure release policy" refers to the time from the detection of the stop of the unauthorized access relating to the notification in the ISP 100 of the system to the release of the countermeasures against the unauthorized access.

The "countermeasure reliability policy" refers to a reference value for determination by the ISP 100 of the system of the method of the countermeasures against unauthorized access relating to the notification to be performed by the countermeasure execution equipment.

The countermeasure release policy and the countermeasure reliability policy are set according to an instruction issued in advance by a client receiving unauthorized access within a range permitted by the security policy in the ISP 100 of the system.

Each piece of the above-mentioned information is described below on the example 1 of the data examples shown in FIG. 22. The IP address of the unauthorized access countermeasure manager site 600 in the "ISP ABC" which manages the IDS 120 in which the unauthorized access related to the notification has been detected is "a. b. c. 100", the countermeasure release policy is "10 minutes", and the countermeasure reliability policy is "90%".

In the unauthorized access notification generated and transmitted in the procedure in S203 shown in FIG. 11, the notifications about the "countermeasure release policy" and the "countermeasure reliability policy" are transmitted in the state in which nothing is indicated (for example, using null data).

By performing the above-mentioned unauthorized access notification procedure, the contents of the detection of unauthorized access to the client site 200 by the IDS 120 are transmitted to the unauthorized access countermeasure manager site 600.

Figure 23:
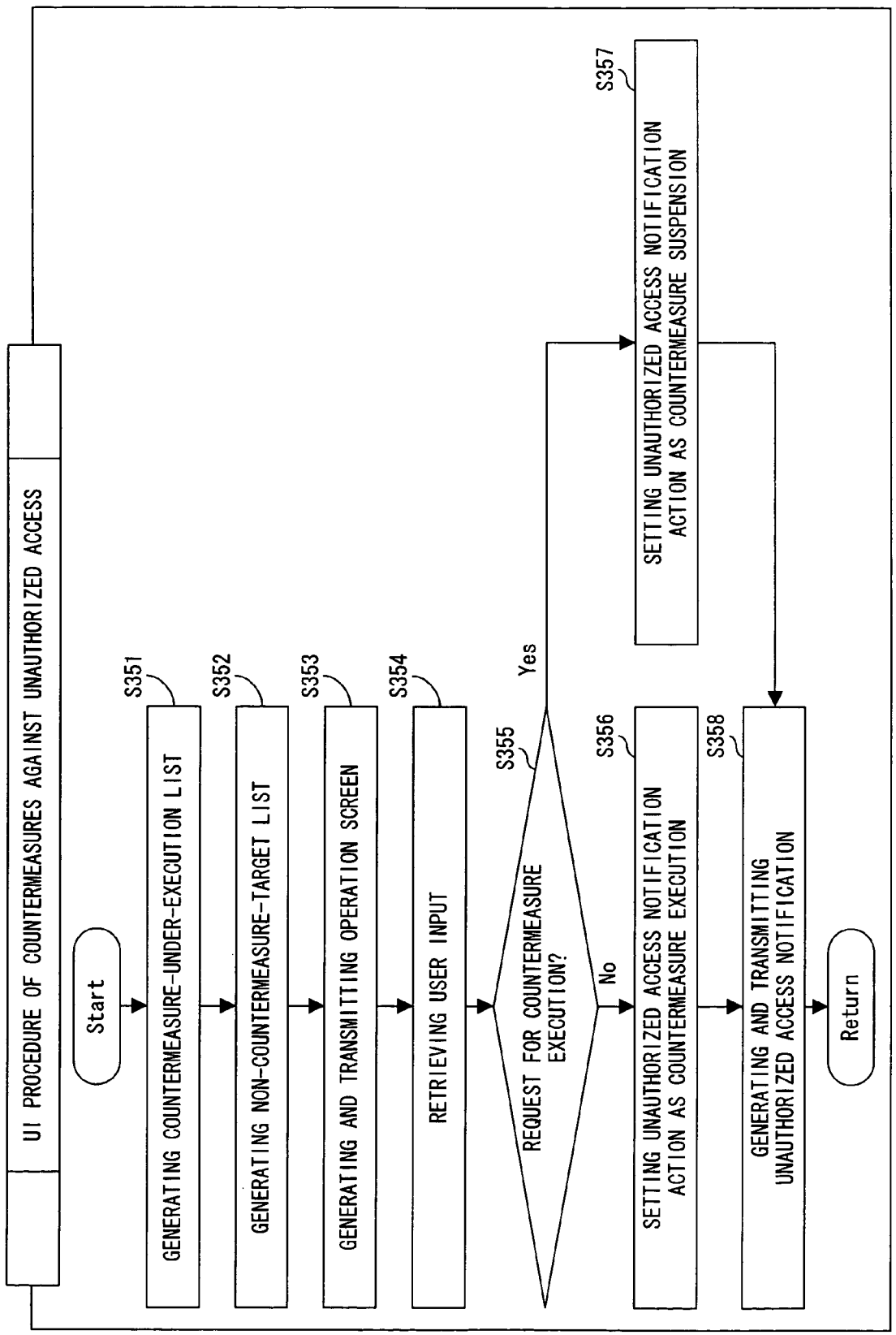
FIG. 23 shows the contents of the procedure of the unauthorized access UI according to the second embodiment of the present invention.

Described below are the contents shown in FIG. 23. FIG. 23 is a flowchart of the contents of the UI procedure of countermeasures against unauthorized access performed by the unauthorized access countermeasure UI engine 712.

This procedure is started by the system administrator, etc. of the client site 200 issuing a request to the unauthorized access notification agent site 700 to perform the procedure by allowing, for example, the Web browser using the unauthorized access countermeasure service user terminal 202.

First, in S351, the history of the operation of each session relating to the execution, suspension, release, etc. of the countermeasures against unauthorized access in the countermeasure execution equipment recorded in the log DB 622 of the unauthorized access countermeasure manager site 600 is obtained. Based on the recorded history, the appropriate countermeasure execution rate of each type of traffic for which the countermeasures against unauthorized access are being taken in the countermeasure execution equipment is calculated by the above-mentioned equation, and a countermeasure-under-execution list is generated by arranging the traffic for each type such that the calculated appropriate countermeasure execution rates can be arranged in an ascending order. Based on the calculated appropriate countermeasure execution rates, the contents of the appropriate countermeasure execution rate of the unauthorized access notification related to the corresponding traffic are updated.

In S352, the record of the traffic passed by the client boundary router 110 is obtained from the traffic DB 720. Based on the record, the packets which are the traffic passed by the client boundary router 110 are arranged for each type such that the number of packets in the time range can be in an ascending order, thereby generating a non-countermeasure-target list.

In S353, the countermeasure-under-execution list generated in S351 and the non-countermeasure-target list generated in S352 are arranged, and the button icons of the above-mentioned "countermeasure suspension" and "countermeasure execution" are arranged so that the operation screen of the service for preventing unauthorized access can be generated. The screen data of the operation screen is transmitted to the unauthorized access countermeasure service user terminal 202.

Upon receipt of the screen data, the unauthorized access countermeasure service user terminal 202 displays the operation screen by the function of the Web browser. The system administrator, etc. of the client site 200 refers to the operation screens in the order displayed on the list, and determines whether or not there is an execution/non-execution error due to the malfunction of the IDS 120.

If an error has been detected as a result of the determination of the system administrator, etc., then the system administrator, etc. selects an item of the error from the countermeasure-under-execution list or the non-countermeasure-target list displayed on the operation screen, and clicks the button icon of the "countermeasure suspension" or "countermeasure execution". Then, the selection information about an item and the type information about the clicked button icon are transmitted as user input from the unauthorized access countermeasure service user terminal 202 to the unauthorized access countermeasure manager site 600.

In S354, the user input transmitted from the unauthorized access countermeasure service user terminal 202 is retrieved. In S355, it is determined whether or not the type information about the button icon clicked for the user input is "countermeasure execution". If the determination result in S355 is YES, then the contents of the "action" of the unauthorized access notification related to the selection information about the item in the user input are "countermeasure execution" in S356. If the determination result in S355 is. NO, that is, if the type information about the button icon clicked for the user input is "countermeasure suspension", then the contents of the "action" of the unauthorized access notification related to the selection information about the item in the user input are "countermeasure suspension" in S357.

In S358, the unauthorized access notification whose contents have been updated in the procedure in S356 or S357 is generated, and transmitted to the unauthorized access countermeasure manager site 600.

By performing the UI procedure of countermeasures against unauthorized access, the unauthorized access countermeasure manager site 600 recognizes the instruction to correct the countermeasures against unauthorized access by the system administrator, etc. of the client site 200.

Figure 24:
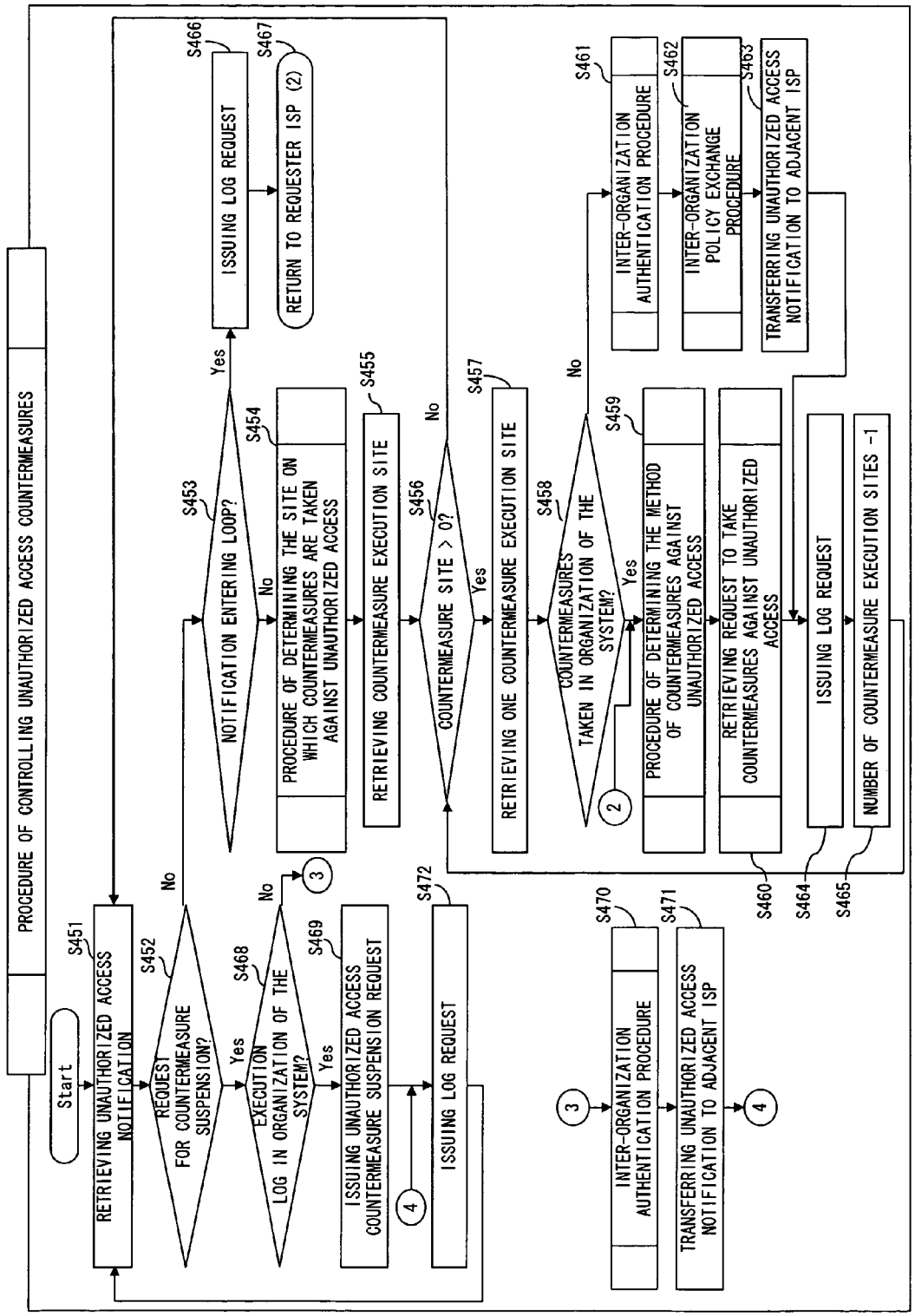
FIG. 24 shows the contents of the procedure of controlling unauthorized access countermeasures according to the second embodiment of the present invention.

Described below is the flowchart shown in FIG. 24. FIG. 24 is a flowchart of the contents of the procedure of controlling unauthorized access countermeasures performed by the unauthorized access countermeasure control engine 611.

First, in S451, an unauthorized access notification is retrieved from the unauthorized access notification agent site 700.

In S452, the above-mentioned action indicated by the retrieved unauthorized access notification is referred to, and it is determined whether or not the action is "countermeasure suspension". If the determination result is YES, then control is passed to the procedure in S468. If the determination result is NO, that is, the action is "countermeasure execution", then control is passed to the procedure in S453.

In S453, the above-mentioned detected ID indicated by the retrieved unauthorized access notification is referred to, and it is determined whether or not the retrieved unauthorized access notification has entered the loop, that is, whether or not the detected ID has been indicated by the unauthorized access notification obtained before, that is, to be more practical, whether or not the same detected ID has been recorded in the log DB 622. If the determination result is YES, then control is passed to the procedure in S466. If the determination result is NO, then control is passed to the procedure in S454.

In S454, the procedure of determining the site on which countermeasures are taken against unauthorized access is performed. The details of the procedure are shown in the flowchart in FIG. 25.

Figure 25:
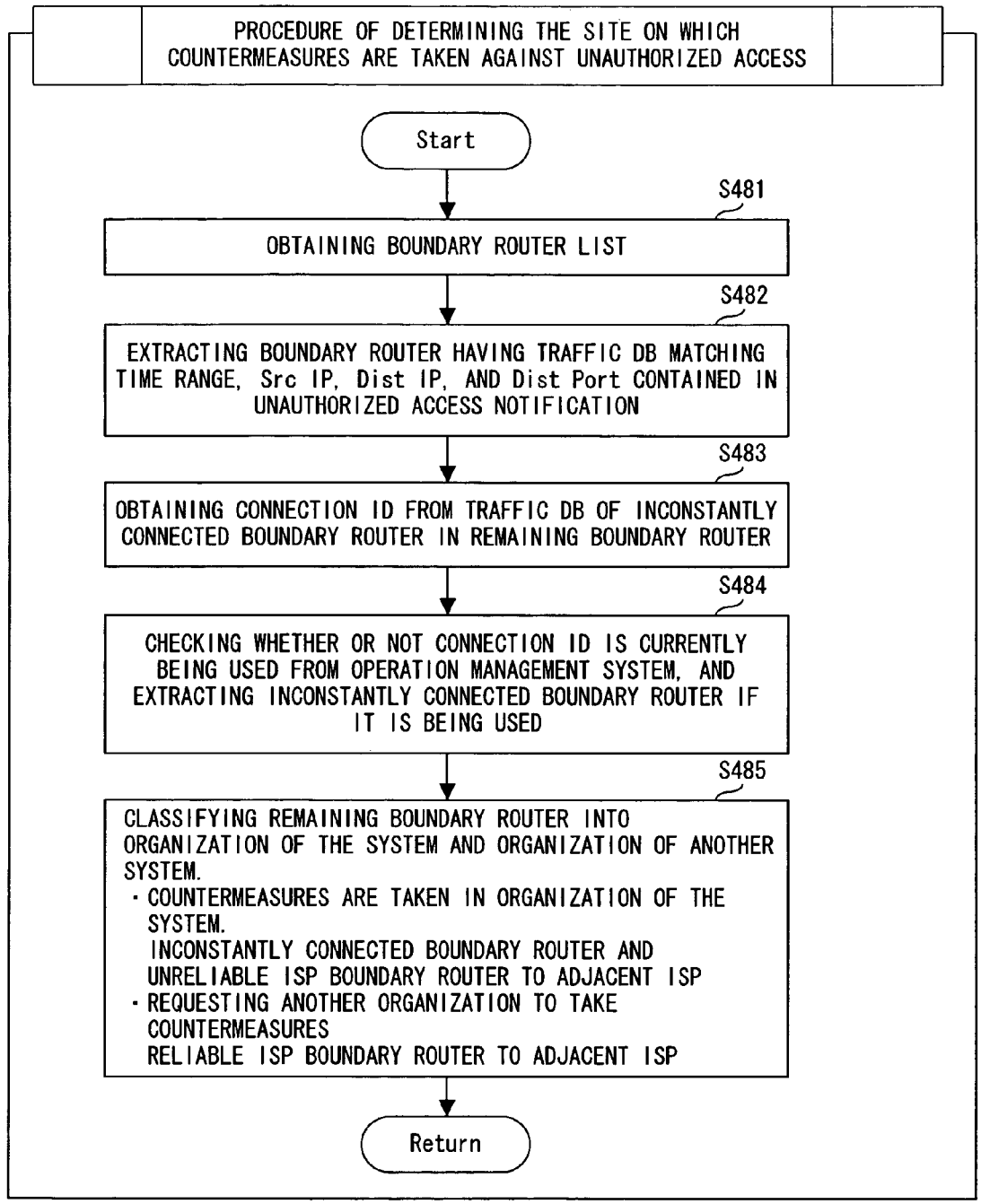
FIG. 25 shows the contents of the procedure of determining the site on which countermeasures are taken against unauthorized access.

Described below is the procedure shown in FIG. 25.

In S481, an inquiry is issued to the operation management system 650, and a list of the boundary router 113 provided in the ISP network 101 is obtained.

In S482, an inquiry is issued to the unauthorized access countermeasure execution agent site 300, and a record matching in time range, Src IP, Dist IP, and Dist Port is extracted from the traffic DB 820. Then, other boundary routers 113 other than the boundary router 113 to which traffic has entered and has been indicated in the extracted record are excluded from the list of the boundary routers 113 obtained in the procedure.

In S483, the routers (POP boundary routers 112) provided for the inconstantly connected user terminal 400 are extracted from the boundary router 113 remaining in the above-mentioned list, and a connection ID indicated in the data record relating to the above-mentioned unauthorized access notification is obtained from the stored data of the traffic DB 820 relating to the extracted POP boundary router 112.

In S484, an inquiry as to whether or not the user specified by the connection ID obtained in the above-mentioned procedure is currently being connected to the ISP network 101 is issued to the operation management system 650. If the user is currently being connected to the ISP network 101, then the inconstantly connected boundary router into which packets enter from the inconstantly connected user terminal currently being used by the user is extracted, and remains in the above-mentioned list. If the user is not currently being connected to the ISP network 101, then the POP boundary router 112 from which unauthorized access enters from the inconstantly connected user terminal 400 which has been used by the user is excluded from the above-mentioned list.

In S485, it is discriminated based on each destination of the boundary router 113 in the list whether the countermeasures against unauthorized access relating to the notification are to be taken in the organization of the system (the ISP 100 of the system) or are to be committed to another organization (for example, the adjacent ISP 300).

To be more practical, if the boundary router 113 in the list is the POP boundary router 112 or if it is the ISP boundary router 111 provided between the ISP network 101 and the adjacent ISP 300 and there is no reliability between the adjacent ISP 300 and the ISP 100 of the system, then the countermeasures are taken in the boundary router 113 managed by the ISP 100 of the system. On the other hand, if the boundary router 113 in the list is the ISP boundary router 111 provided between the ISP network 101 and the adjacent ISP 300, and there is reliability between the adjacent ISP 300 and the ISP 100, then the ISP boundary router 111 does not take countermeasures, but the adjacent ISP 300 is requested to take the countermeasures. In this procedure, the sites at which countermeasures against the unauthorized access relating to the above-mentioned notification are taken are completely determined.

After the completion of the procedure in S485, control is returned to the procedure shown in FIG. 24.

In S455 shown in FIG. 24, the countermeasure execution site obtained in the above-mentioned procedure of determining the site on which countermeasures are taken against unauthorized access is retrieved.

In S456, it is determined whether or not the number of sites at which no countermeasures have been taken is larger than 0 in the countermeasure execution sites retrieved in the procedure in S455. If the determination result is YES, that is, if there are sites at which no countermeasures have been taken, control is passed to the procedure in S457. If the determination result is NO, that is, if the countermeasures to be taken in all sites at which countermeasures are to be taken have been completed, then control is returned to the procedure in S451, and the above-mentioned procedure is repeated.

In S457, one of the sites at which no countermeasures have been taken is retrieved from among the countermeasure execution sites retrieved in the procedure in S455.

In S458, it is determined whether or not the site retrieved in the preceding site is the boundary router 113 in which the countermeasures are to be taken in the organization of the system. If the determination result is YES, control is passed to the procedure in S459. On the other hand, if the determination result is NO, that is, if the site is the ISP boundary router 111 in which the adjacent ISP 300 is requested to take the countermeasures, then control is passed to the procedure in S461.

In S459, the procedure of determining the method of countermeasures against unauthorized access is used. Since the details of the procedure are basically the same as those in the flowchart shown in FIG. 15, the explanation of the details is omitted here. However, in the procedure in S459, since the countermeasure execution equipment is the boundary router 113 and the inherent information about the boundary router 113 belongs to the operation management system 650, the inherent information about the countermeasure execution equipment is obtained from the operation management system 650, which is not described in the explanation by referring to FIG. 15.

In S460, a request to take countermeasures against unauthorized access is transmitted to the unauthorized access countermeasure execution agent site 800 for controlling the boundary router 113 which has been retrieved in the procedure in S455, and then control is passed to the procedure in S464.

The request to take countermeasures against unauthorized access indicates the information designating the boundary router 113 for execution of countermeasures, and an unauthorized access notification retrieved in the process in S451 is added to the request. At the unauthorized access countermeasure execution agent site 800 where the request is received, the unauthorized access countermeasure execution engine 811 performs the procedure of taking countermeasures against unauthorized access. The procedure of taking countermeasures against unauthorized access is described later.

If the determination result in the procedure in S458 is NO, that is, if the site retrieved in the procedure at S455 is the ISP boundary router 111 which has requested the adjacent ISP 300 to perform the countermeasures against the unauthorized access, then the inter-organization authentication procedure is performed in S461. The details of the procedure are shown in the flowchart in FIG. 26.

Figure 26:
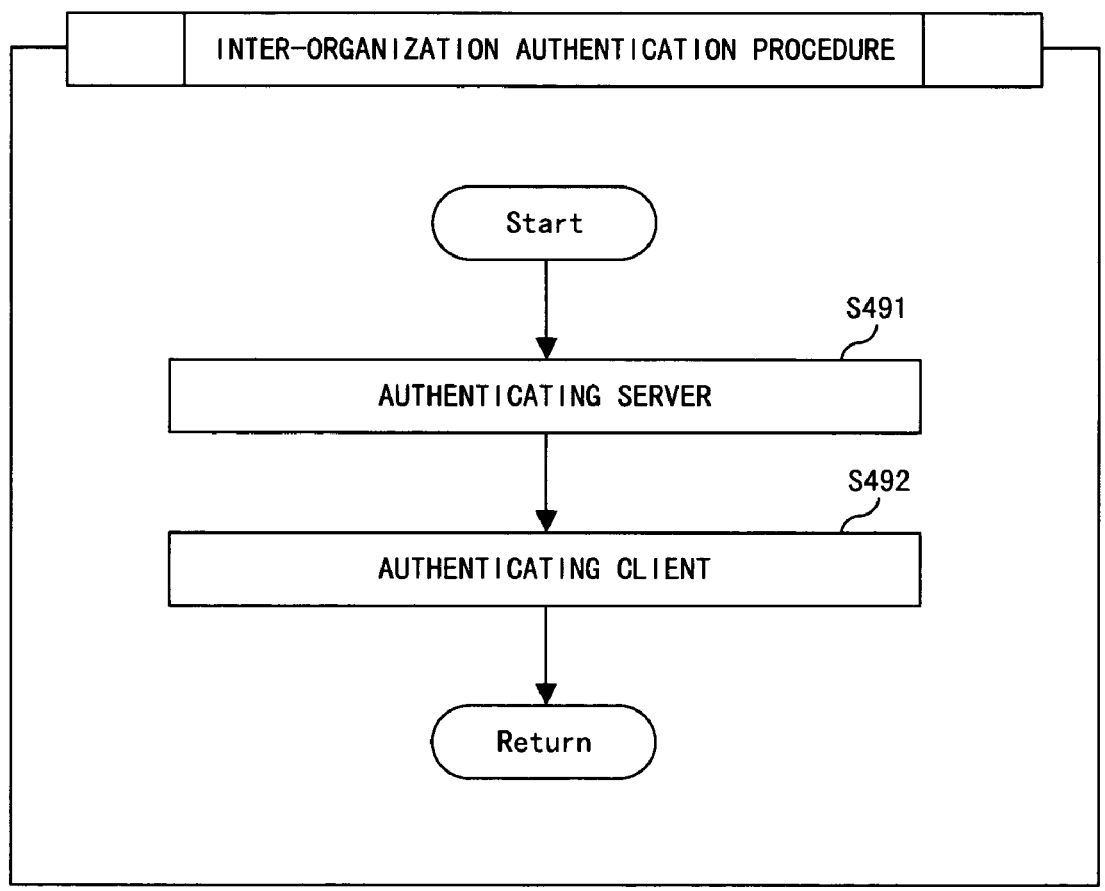
FIG. 26 shows the contents of the inter-organization authentication procedure.

The procedure shown in FIG. 26 is described below first.

In S491, a server authenticating process is performed using the certificate 620, and it is checked that the adjacent ISP (server) 300 which is requested to perform the countermeasures is a reliable ISP, not a malicious site.

In S492, a client authenticating process is performed using the certificate 620, and it is checked by the ISP which is requested to perform the countermeasures that the ISP 100 (client) of the system which has requested the countermeasures is not a malicious site.

When the procedure in S492 is completed, control is returned to the procedure shown in FIG. 24.

By performing the above-mentioned inter-organization authentication procedure, the touch of information relating to countermeasures against unauthorized access by malicious site can be prevented.

In S462 performed after S461 shown in FIG. 24, the inter-organization policy exchange procedure is performed. The details of the procedure are shown by the flowchart in FIG. 27.

Figure 27:
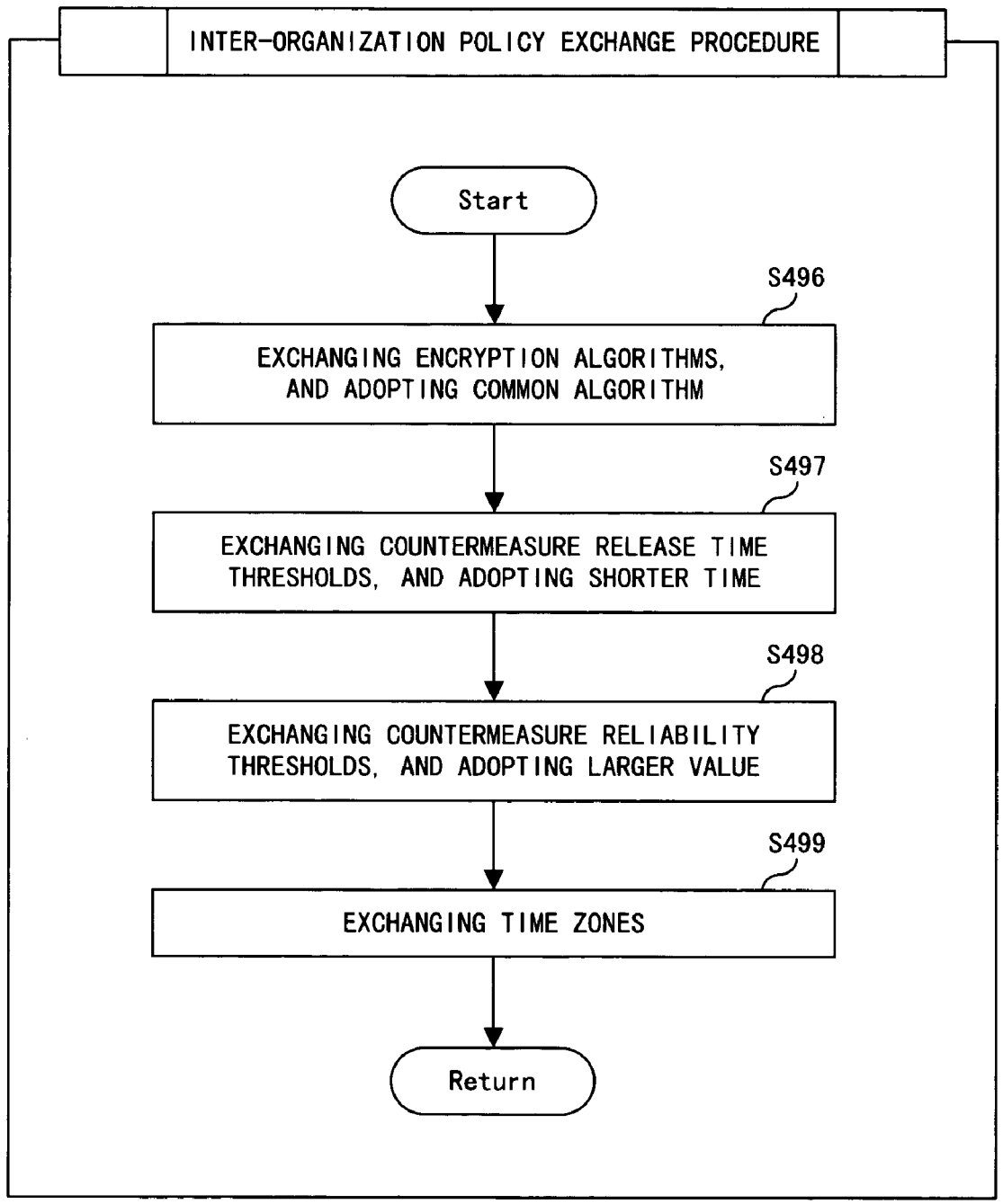
FIG. 27 shows the contents of the inter-organization policy exchange procedure.

The procedure shown in FIG. 27 is described below.

First, in S496, to protect the information against the decryption by a malicious third party, the encryption algorithms are exchanged between the ISP 100 of the system which is a countermeasure requester and the adjacent ISP 300 which if a countermeasure requested provider.

In S497, the countermeasure release time thresholds which are the information about the policy 621 are exchanged between the ISP 100 of the system which is a countermeasure requester and the adjacent ISP 300 which is a countermeasure requested provider, and a value requiring a shorter time is used as a countermeasure release time threshold between them.

In S498, the countermeasure reliability thresholds which are the information about the policy 621 are exchanged between the ISP 100 of the system which is a countermeasure requester and the adjacent ISP 300 which is a countermeasure requested provider, and a larger value is used as a countermeasure reliability threshold between them.

In S499, the time zones (time period information by area) are exchanged between the ISP 100 of the system which is a countermeasure requester and the adjacent ISP 300 which is a countermeasure requested provider to enable the time information used when countermeasures are recorded between them to be represented by local time for improvement in convenience.

When the procedure in S499 is completed, control is returned to the procedure shown in FIG. 24.

By performing the above-mentioned inter-organization policy exchange procedure, the difference in security policy relating to the network operation which can be made between organizations can be adjusted before requesting a countermeasure requested provider to perform the countermeasures against unauthorized access.

In S463 performed after S462 shown in FIG. 24, the unauthorized access notification retrieved in the above-mentioned procedure in S451 is transferred to the adjacent ISP 300 which is a countermeasure requested provider. At this time, if there are differences between the countermeasure release policy and the countermeasure requested provider indicated in the unauthorized access notification retrieved in the procedure in S451, and between the countermeasure release time threshold and the countermeasure reliability threshold adopted in the execution of the above-mentioned inter-organization policy exchange procedure, then the countermeasure release time threshold and the countermeasure reliability threshold are overwritten respectively as a countermeasure release policy and a countermeasure reliability policy, and transferred to the adjacent ISP 300 which is a countermeasure requested provider.

In S464, a log request is transmitted to the unauthorized access countermeasure record control engine 612, and a request to record the contents of the process performed in the above-mentioned procedure in S460 or from S461 to S463 is issued. The unauthorized access notification obtained in the procedure in S451 is added to the log request.

In S465, the number of countermeasure execution sites obtained in the procedure of determining the site on which countermeasures are taken against unauthorized access in S454 is decreased by 1, and then control is returned to the procedure in S456, and the above-mentioned processes are repeated.

If the determination result in the above-mentioned procedure in S453 is YES, then it can be assumed that the transfer of the unauthorized access notification is repeated between the ISPs (an unauthorized access notification has entered the loop), and no countermeasures are taken against unauthorized access.

At this time, in S466, a log request is transmitted to the unauthorized access countermeasure record control engine 612 to record that the unauthorized access notification entering the loop has been obtained. The unauthorized access notification obtained in the procedure in S451 is added to the log request.

Afterwards, in S467, an instruction is issued to the unauthorized access countermeasure manager site 600 of the ISP which is a source of the notification (that is, a requester of the unauthorized access countermeasures) retrieved in S451 so that the procedure of controlling unauthorized access countermeasures being performed therein can be started from S459, thereby performing the countermeasures against the unauthorized access relating to the unauthorized access notification in the ISP.

If the determination result in the procedure in S452 is YES, that is, the above-mentioned action indicated in the unauthorized access notification retrieved in the procedure in S451 is set as "countermeasure suspension", then it is determined in S468 by referring to the history recorded in the log DB 622 whether or not the boundary router 113 managed by the ISP 100 of the system performs the countermeasures against the unauthorized access relating to the unauthorized access notification.

If the determination result in S468 is YES, then an unauthorized access countermeasure suspension request is transmitted to the unauthorized access countermeasure execution agent site 800 for controlling the boundary router 113 which is performing the countermeasures in S469, and then control is passed to the procedure in S472.

The unauthorized access countermeasure suspension request includes the information designating the boundary router 113 for suspending the countermeasures, and the unauthorized access notification retrieved in the process in S451 is added thereto. Upon receipt of the request at the unauthorized access countermeasure execution agent site 800, the unauthorized access countermeasure execution engine 811 performs the procedure of taking countermeasures against unauthorized access. The procedure of taking countermeasures against unauthorized access is described later.

On the other hand, if the determination result in S468 is NO, the inter-organization authentication procedure similar to the above-mentioned procedure in S461 is performed in S470. In the subsequent S471, the unauthorized access notification retrieved in the procedure in S451 is transferred to the adjacent ISP 300 which is a countermeasure requested provider.

In S472, a log request is transmitted to the unauthorized access countermeasure record control engine 612 to record the contents of the process performed in the above-mentioned procedure in S469 or from S470 to S471. Afterwards, control is passed to the procedure in S451, and the above-mentioned procedures are repeated. The unauthorized access notification obtained in the procedure in S451 is added to the log request.

By performing the above-mentioned procedure of controlling unauthorized access countermeasures, an instruction to perform countermeasures against unauthorized access is issued to protect the Web system 201 of the client site 200 against unauthorized access.

Figure 28:
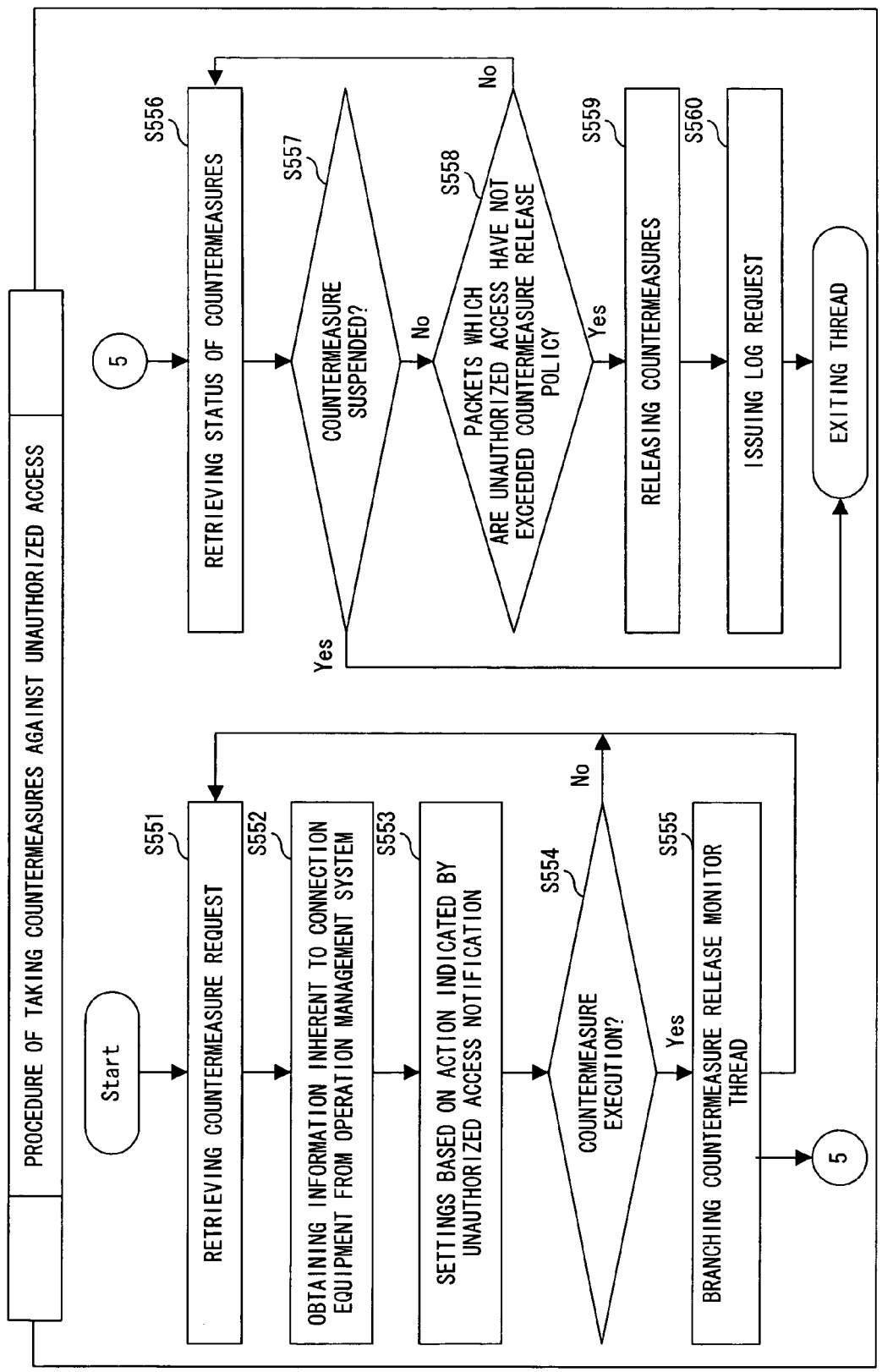
FIG. 28 shows the contents of the procedure of taking countermeasures against unauthorized access according to the second embodiment of the present invention.

Described below is the flowchart shown in FIG. 28. FIG. 28 is a flowchart of the contents of the procedure of taking countermeasures against unauthorized access performed by the unauthorized access countermeasure execution engine 811.

First, in S551, a request for the countermeasures against unauthorized access transmitted from the unauthorized access countermeasure manager site 600 is obtained.

In S552, the information about "router type", "router IP", and "router PW" in the inherent information about the boundary router 113 which is countermeasure execution equipment is obtained from the operation management system 650.

In S553, the unauthorized access notification contained in the request for the countermeasures against unauthorized access obtained in the procedure in S551 is referred to, and the settings are made for the boundary router 113 to perform the countermeasures against unauthorized access or suspend the countermeasures against unauthorized access being performed according to the contents of the "action" of the notification. When the countermeasures against unauthorized access are performed, the settings to perform the countermeasures against unauthorized access in the method indicated in the "countermeasure execution method" of the unauthorized access notification are made for the boundary router 113.

Each piece of information obtained in the procedure in S552 for the settings for the boundary router 113 is used, and the countermeasures against unauthorized access in the method relating to the determination by the above-mentioned settings for the boundary router 113 are started or suspended.

In S554, it is determined whether or not the settings for the boundary router 113 have indicated the execution of the countermeasures against unauthorized access. If the determination result is YES, then a thread is branched in S555. While the procedure of iterative operations from S551 to S555 is performed, the procedure from S556 to S560 is performed. On the other hand, if the determination result in S554 is NO, that is, the settings made for the boundary router 113 indicates the suspension of the countermeasures against unauthorized access, then control is returned to the procedure in S551, and the above-mentioned procedures are repeated.

In S556, the status of the countermeasures against unauthorized access set for the boundary router 113 in the procedure in S553 is retrieved.

In S557, it is determined whether or not the status of the countermeasures indicates the suspension of the countermeasures against unauthorized access. If the determination result is YES, then the thread branched in the procedure in S555 from the S556 to S560 is immediately terminated.

If the determination result is NO, that is, the settings for the boundary router 113 in the procedure in S553 indicate the execution of the countermeasures against unauthorized access, control is passed to the procedure in S558, then the information about the traffic passed by the boundary router 113 recorded in the traffic DB 820 is referred to, and it is determined whether or not packets which are unauthorized access are continuously received by the ROM 503 over a time of the countermeasure release policy indicated in the unauthorized access notification contained in the request for the countermeasures against unauthorized access obtained in the procedure in S551.

If the determination result in S558 is YES, that is, packets which are unauthorized access are not continuously received over a time of the countermeasure release policy, then control is passed to the procedure in S559. If the determination result is NO, that is, if packets which are unauthorized access are still received or if the duration in which the packets which are unauthorized access has not reached a time of the countermeasure release policy, then control is returned to the procedure in S556, and the above-mentioned procedure is repeated.

In S559, the boundary router 113 is controlled and the countermeasures against unauthorized access set in the above-mentioned procedure in S553 are released.

In S560, a log request is transmitted to the unauthorized access countermeasure manager site 600 to request it to record the release of the execution of the countermeasures. The unauthorized access notification referred to in the procedure in S553 is added to the log request.

After completing the procedure in S560, the thread branched in the procedure in S555 from the S556 to S560 is terminated.

By the above-mentioned procedure of taking countermeasures against unauthorized access, the countermeasures against unauthorized access are taken and the Web system 201 of the client site 200 is protected against unauthorized access.

Figure 29:
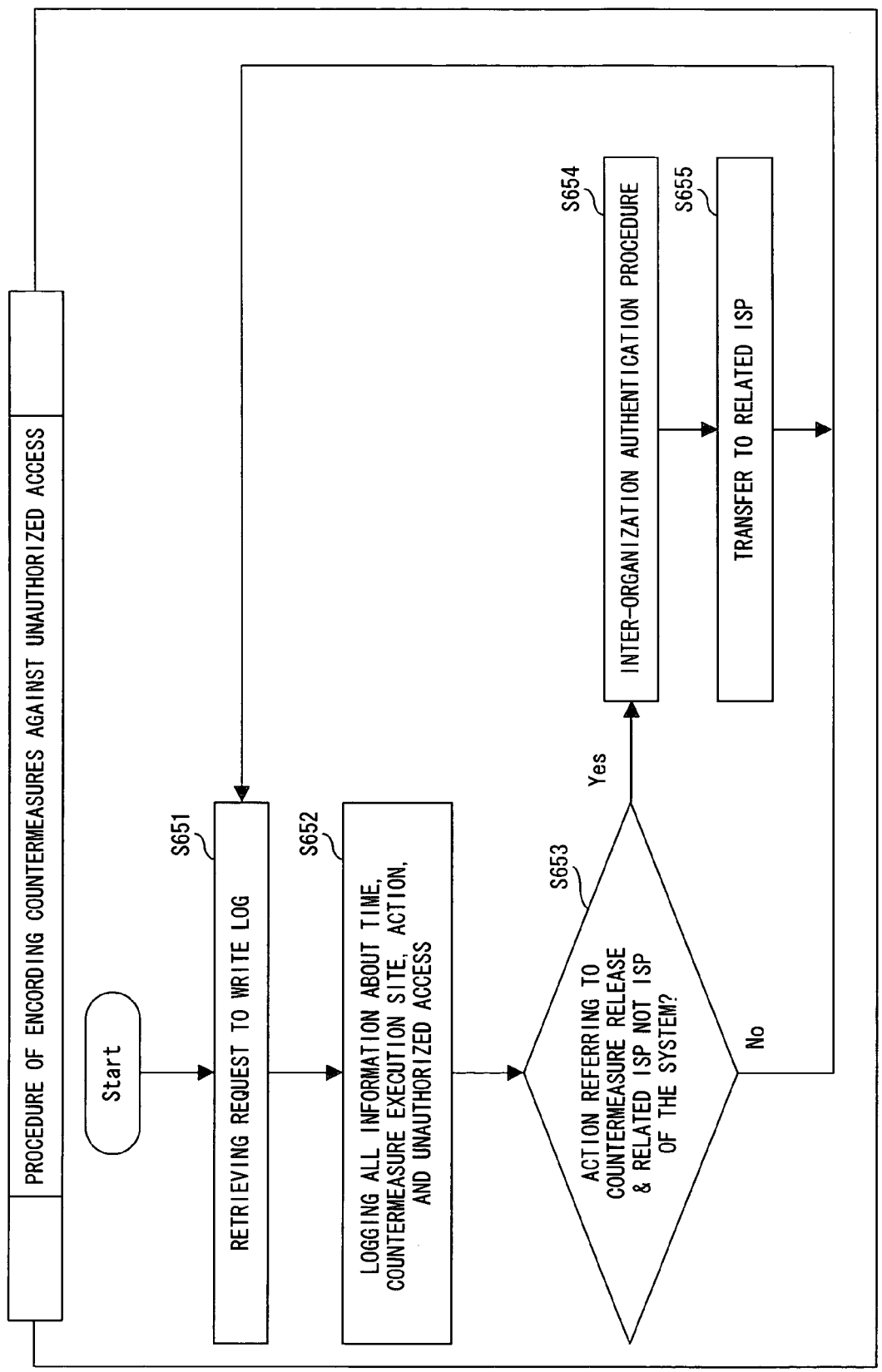
FIG. 29 shows the contents of the procedure of recording unauthorized access according to the second embodiment of the present invention.

Described below is the flowchart shown in FIG. 29. FIG. 29 is a flowchart of the contents of the procedure of recording countermeasures against unauthorized access performed by the unauthorized access countermeasure record control engine 612.

First, in S651, a log request transmitted from the unauthorized access countermeasure control engine 611 or the unauthorized access countermeasure execution agent site 800 is retrieved.

In S652, the current time, the information designating the boundary router 113 and the adjacent ISP 300 which are the sites at which countermeasures are executed or suspended, the action ("countermeasure execution", "transfer of countermeasures", "countermeasure suspension", and "countermeasure release") indicating the contents of the action taken in the ISP 100 of the system, and the contents of the unauthorized access notification added to the log request retrieved in S651 are recorded in the log and stored in the log DB 622.

In S653, it is determined whether or not the contents of the above-mentioned action is "countermeasure release", and the "related ISP" in the unauthorized access notification added to the log request retrieved in S651 is different from the ISP 100, that is, the unauthorized access notification is generated in another ISP and transferred. If the determination result is YES, the inter-organization authentication procedure shown in FIG. 26 similar to the above-mentioned procedure is performed in S654. In the subsequent S655, a log request retrieved in the procedure in S651 is transferred to the address indicated by the "related ISP manager IP" in the unauthorized access notification.

When the procedure in S655 is terminated, or when the determination result in S653 is NO, control is passed to the procedure in S651, and the procedure is repeated subsequently.

By the above-mentioned procedure of recording countermeasures against unauthorized access, the system administrator of the ISP 100 of the system can grasp the status of the countermeasures against unauthorized access on the client site 200 of the ISP 100 of the system from the record of the history.

The present invention can also be embodied by storing in a computer-readable storage medium various control programs executed by each component of the unauthorized access prevention system embodying the present invention, and executing them by the computer reading the control programs from the storage medium.

Figure 30:
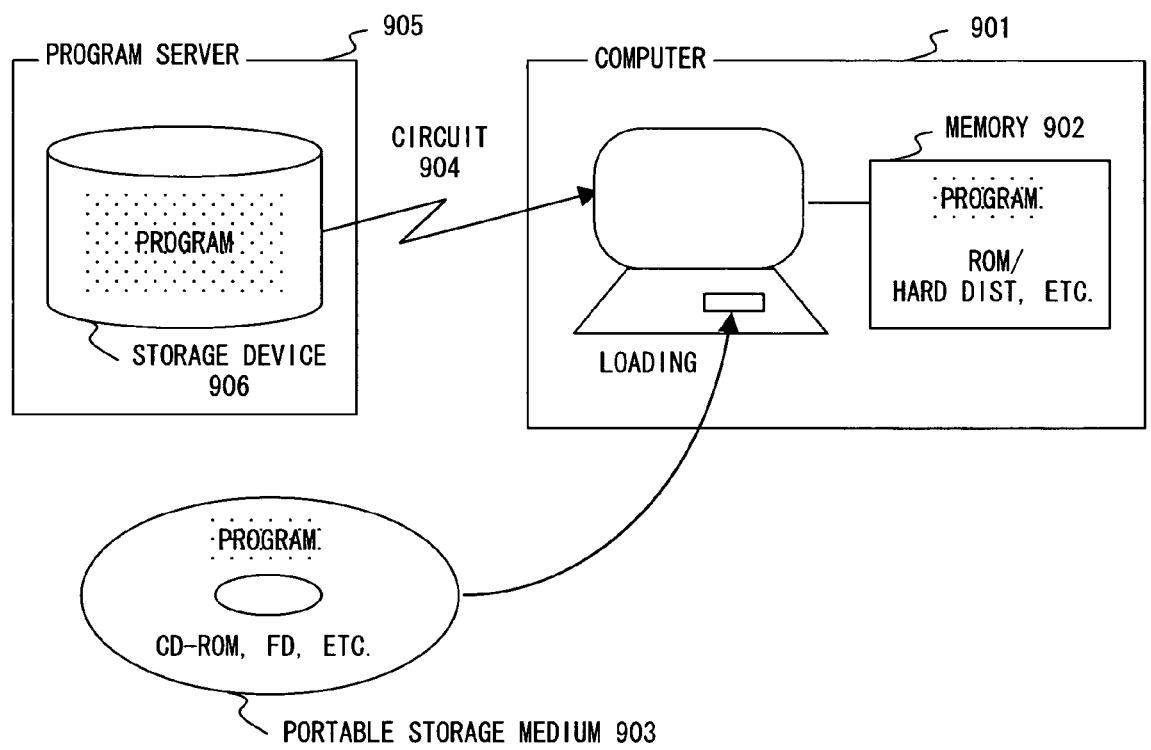
FIG. 30 shows a storage medium from which a recorded control program can be read by a computer.

FIG. 30 shows an example of a storage medium from which a computer can read a recorded control program. The storage medium can be any device which can electrically, magnetically, optically, mechanically, or chemically accumulate information such as data, a program, etc., and can read the information from a computer. The storage medium can be, for example, memory 902 such as RAM, ROM, a hard disk device, etc., provided as a built-in or external accessory device, or a portable storage medium 903 such as a flexible disk, an MO (magneto-optical disk device), CD-ROM, CD-R/W, a DVD, a 8mm video tape, a memory card, etc. as shown in FIG. 30.

A storage medium can be a storage device 906 provided for a computer functioning as a program server 905 connected to the computer 901 through a communications circuit 904. In this case, a transmission signal obtained by modulating a carrier wave using a data signal representing a control program is transmitted from the program server 905 through the communications circuit 904 which is a transmission medium, and the computer 901 can execute the control program by demodulating the received transmission signal and regenerating a control program.

The transmission medium can be a cable communications medium, for example, metal cable including a coaxial cable, a twisted pair cable, etc., an optical communications cable, etc., or a radio communications medium, for example, satellite communications, terrestrial wave radio communications etc.

A carrier wave is an electromagnetic wave or laser. However, a carrier wave can be a direct current signal. In this case, a data communications signal has a base band waveform without a carrier wave. Therefore, the data communications signal embodied by a carrier wave can be either a modulated broadband signal or a non-modulated baseband signal (corresponding to the case in which a direct current signal using an electrical voltage of 0 as a carrier wave).

The present invention is not limited to the above-mentioned embodiments, but can be various improvement and variations within the range of the gist of the present invention.

As described above in detail, the present invention generates a screen on which a case where countermeasures are being taken to protect a destination against unauthorized access in the traffic entering a predetermined position on a communications network can be identified; obtains an instruction to take the countermeasures to be taken for each type of traffic or an instruction to suspend the countermeasures being taken; and executes the countermeasures or suspends the countermeasures at the instruction.

Thus, a system administrator can detect an error of executing/not-executing countermeasures against unauthorized access due to a malfunction in detecting unauthorized access, and can allow the system administrator to issue an instruction to correct the error when the error is detected, thereby performing appropriate countermeasures against unauthorized access.

Otherwise, the present invention determines the method of the countermeasures to protect the destination against unauthorized access for a predetermined traffic in a communications network based on the rate at which the countermeasures performed on the predetermined traffic have been executed without suspension, and the countermeasures are executed in the method according to the determination.

Thus, appropriate countermeasures against unauthorized access can be executed depending on the level of the normal access rate contained in the traffic.

As described above, with any configuration of the present invention, the influence of the malfunction in detecting unauthorized access on an attacked organization and a normal user can be reduced.

What is claimed is:

1. An unauthorized access prevention system, comprising:
a countermeasure method determination unit determining a method of taking countermeasures to protect a destination against unauthorized access in predetermined traffic entering a communications network based on a rate at which the countermeasures were taken without suspension in the predetermined traffic, the rate indicating a probability that the predetermined traffic is unauthorized access, the rate being a value determined by calculating a number of times that the countermeasures were taken and subtracting a number of times that countermeasures were suspended to determine a number of times that countermeasures were taken without suspension, and dividing the number of times that countermeasures were taken without suspension by the number of times that countermeasures were taken, for the predetermined traffic to be processed;

a storage device storing at least the number of times that countermeasures were taken and the number of times that countermeasures were taken without suspension; and a countermeasure execution control unit controlling to take the countermeasures in the determined method, wherein the countermeasure method determination unit, when an ACL (access control list) filter or a flow rate control can be selected as a result of the determination, selects the ACL filter when the rate is larger than a first predetermined threshold, and selects the flow rate control when the rate is smaller than the first predetermined threshold, the countermeasure method determination unit, when the ACL filter or a queue control can be selected as a result of the determination, selects the ACL filter when the rate is larger than a second predetermined threshold, and selects the queue control when the rate is smaller than the second predetermined threshold, the countermeasure method determination unit, when the flow rate control or queue control can be selected as a result of the determination, selects the flow rate control when the rate is larger than a third predetermined threshold, and selects the queue control when the rate is smaller than the third predetermined threshold.

2. A computer-readable storage medium storing a program used to direct a computer to prevent unauthorized access by performing the processes, comprising:

a countermeasure method determining process of determining a method of taking countermeasures to protect a destination against unauthorized access in predetermined traffic entering a communications network based on a rate at which the countermeasures were taken without suspension in the predetermined traffic, the rate indicating a probability that the predetermined traffic is unauthorized access, the rate being a value determined by calculating a number of times that the countermeasures were taken and subtracting a number of times that countermeasures were suspended to determine a number of times that countermeasures were taken without suspension, and dividing the number of times that countermeasures were taken without suspension by the number of times that countermeasures were taken, for the predetermined traffic to be processed; and a countermeasure execution controlling process of controlling to take the countermeasures in the determined method, wherein the countermeasure method determination unit, when an ACL (access control list) filter or a flow rate control can be selected as a result of the determination, selects the ACL filter when the rate is larger than a first predetermined threshold, and selects the flow rate control when the rate is smaller than the first predetermined threshold, the countermeasure method determination unit, when the ACL filter or a queue control can be selected as a result of the determination, selects the ACL filter when the rate is larger than a second predetermined threshold, and selects the queue control when the rate is smaller than the second predetermined threshold, the countermeasure method determination unit, when the flow rate control or queue control can be selected as a result of the determination, selects the flow rate control when the rate is larger than a third predetermined threshold, and selects the queue control when the rate is smaller than the third predetermined threshold.

3. The storage medium according to claim 2, wherein said program is executed by the computer to further allow the computer to perform a countermeasure execution history recording process of recording a history of control performed by the countermeasure execution controlling process, and the countermeasure method determining process allows the computer to perform a process of determining the method for countermeasures according to the history.

4. The storage medium according to claim 2, wherein the countermeasure execution controlling process allows the computer to perform the processes, comprising:

a searching process of searching an entry path of the unauthorized access to the communications network;

a countermeasures execution site determining process of determining the site on which the countermeasures are to be taken based on the search result; and a notifying process of issuing to a source of the unauthorized access to the communications network a notification of the determination of the execution of the countermeasures and a method determined by the countermeasure method determining process when the determination is made to take the countermeasures at the source.

5. The storage medium according to claim 4, wherein said notifying process allows the computer to perform the process of issuing the notification after mutually performing an authentication check with the source of unauthorized access.

6. The storage medium according to claim 4, wherein said notifying process allows the computer to perform the process of issuing the notification to the source after exchanging information about a security policy in each network operation with the source of unauthorized access.

7. The storage medium according to claim 6, wherein said information about the security policy is information about a threshold of the rate based on which the method for the countermeasures is determined by executing the countermeasure method determining process.

8. The storage medium according to claim 7, wherein when the threshold indicated by the information about the security policy is different between the communications network and the source, the countermeasure method determination unit can define a larger value between the network and the source as a threshold of the rate based on which the method for the countermeasures is determined.

9. An unauthorized access prevention method, comprising:

determining a method of taking countermeasures to protect a destination against unauthorized access in predetermined traffic entering a communications network based on a rate at which the countermeasures were taken without suspension in the predetermined traffic, the rate indicating a probability that the predetermined traffic is unauthorized access, the rate being a value determined by calculating a number of times that the countermeasures were taken and subtracting a number of times that countermeasures were suspended to determine a number of times that countermeasures were taken without suspension, and dividing the number of times that countermeasures were taken without suspension by the number of times that countermeasures were taken, for the predetermined traffic to be processed; and controlling to take the countermeasures in the determined method, wherein the countermeasure method determination unit, when an ACL (access control list) filter or a flow rate control can be selected as a result of the determination, selects the ACL filter when the rate is larger than a first predetermined threshold, and selects the flow rate control when the rate is smaller than the first predetermined threshold, the countermeasure method determination unit, when the ACL filter or a queue control can be selected as a result of the determination, selects the ACL filter when the rate is larger than a second predetermined threshold, and selects the queue control when the rate is smaller than the second predetermined threshold, the countermeasure method determination unit, when the flow rate control or queue control can be selected as a result of the determination, selects the flow rate control when the rate is larger than a third predetermined threshold, and selects the queue control when the rate is smaller than the third predetermined threshold.

* * * * *